United States Patent
Szczesniak et al.

(10) Patent No.: US 10,934,193 B2
(45) Date of Patent: Mar. 2, 2021

(54) ADVANCED OXIDATION PROCESS METHODS FOR DEGASIFICATION OF REACTOR VESSEL

(71) Applicant: Evoqua Water Technologies LLC, Lowell, MA (US)

(72) Inventors: Adam Szczesniak, Berlin, CT (US); Jonathan H. Wood, Needham, MA (US); Bruce L. Coulter, Rockford, IL (US); Christopher Hall, Colorado Springs, TX (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 594 days.

(21) Appl. No.: 15/571,860

(22) PCT Filed: May 6, 2016

(86) PCT No.: PCT/US2016/031248
§ 371 (c)(1),
(2) Date: Nov. 6, 2017

(87) PCT Pub. No.: WO2016/179514
PCT Pub. Date: Nov. 10, 2016

(65) Prior Publication Data
US 2018/0134592 A1  May 17, 2018

Related U.S. Application Data

(60) Provisional application No. 62/158,014, filed on May 7, 2015.

(51) Int. Cl.
*C02F 1/32* (2006.01)
*C02F 1/72* (2006.01)
(Continued)

(52) U.S. Cl.
CPC .............. *C02F 1/725* (2013.01); *C02F 1/001* (2013.01); *C02F 1/20* (2013.01); *C02F 1/32* (2013.01);
(Continued)

(58) Field of Classification Search
CPC .... C02F 1/20; C02F 1/722; C02F 1/32; C02F 1/725; C02F 1/001; C02F 2103/06;
(Continued)

(56) References Cited

U.S. PATENT DOCUMENTS

| 4,595,498 A | * 6/1986 | Cohen | B01D 61/145 210/192 |
| 8,741,155 B2 | 6/2014 | Coulter | |

(Continued)

*Primary Examiner* — Cameron J Allen

(57) ABSTRACT

According to various aspects and embodiments, a system and method for treating groundwater contaminated with an organic contaminant is provided. According to some embodiments, the contaminated groundwater is treated by introducing a persulfate to produce a first treated aqueous solution, exposing the first treated aqueous solution to ultraviolet light to produce a second treated aqueous solution and one or more gases, and removing the one or more gases generated from exposing the first treated aqueous solution to the ultraviolet light.

21 Claims, 15 Drawing Sheets

(51) Int. Cl.
  *C02F 1/20* (2006.01)
  *C02F 1/00* (2006.01)
  *C02F 101/34* (2006.01)
  *C02F 103/06* (2006.01)
  *C02F 101/36* (2006.01)
  *C02F 101/38* (2006.01)

(52) U.S. Cl.
  CPC .............. *C02F 1/722* (2013.01); *C02F 1/004* (2013.01); *C02F 2101/34* (2013.01); *C02F 2101/36* (2013.01); *C02F 2101/38* (2013.01); *C02F 2103/06* (2013.01); *C02F 2305/10* (2013.01); *Y02A 20/152* (2018.01)

(58) Field of Classification Search
  CPC .............. C02F 2101/38; C02F 2101/36; C02F 2305/10; C02F 2101/34; C02F 1/004; Y02A 20/156
  See application file for complete search history.

(56) References Cited

U.S. PATENT DOCUMENTS

| | | |
|---|---|---|
| 8,961,798 B2 | 2/2015 | Coulter |
| 9,365,435 B2 | 6/2016 | Coulter |
| 9,365,436 B2 | 6/2016 | Coulter |
| 9,725,343 B2 | 8/2017 | Coulter |
| 9,764,968 B2 | 9/2017 | Coulter |
| 2009/0142137 A1* | 6/2009 | Michailuck ............... B09C 1/00 405/128.7 |
| 2011/0210048 A1* | 9/2011 | Coulter .................... C02F 1/32 210/85 |
| 2014/0144821 A1* | 5/2014 | Sitkiewitz ............... C02F 1/325 210/96.2 |

* cited by examiner

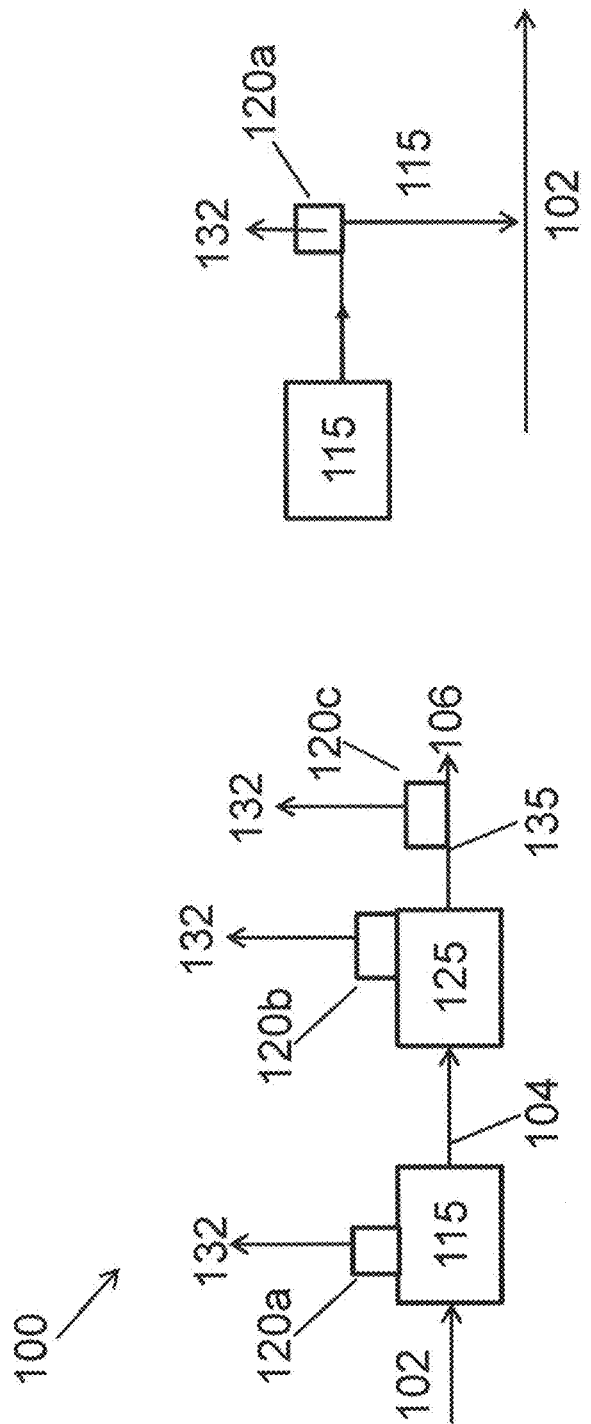

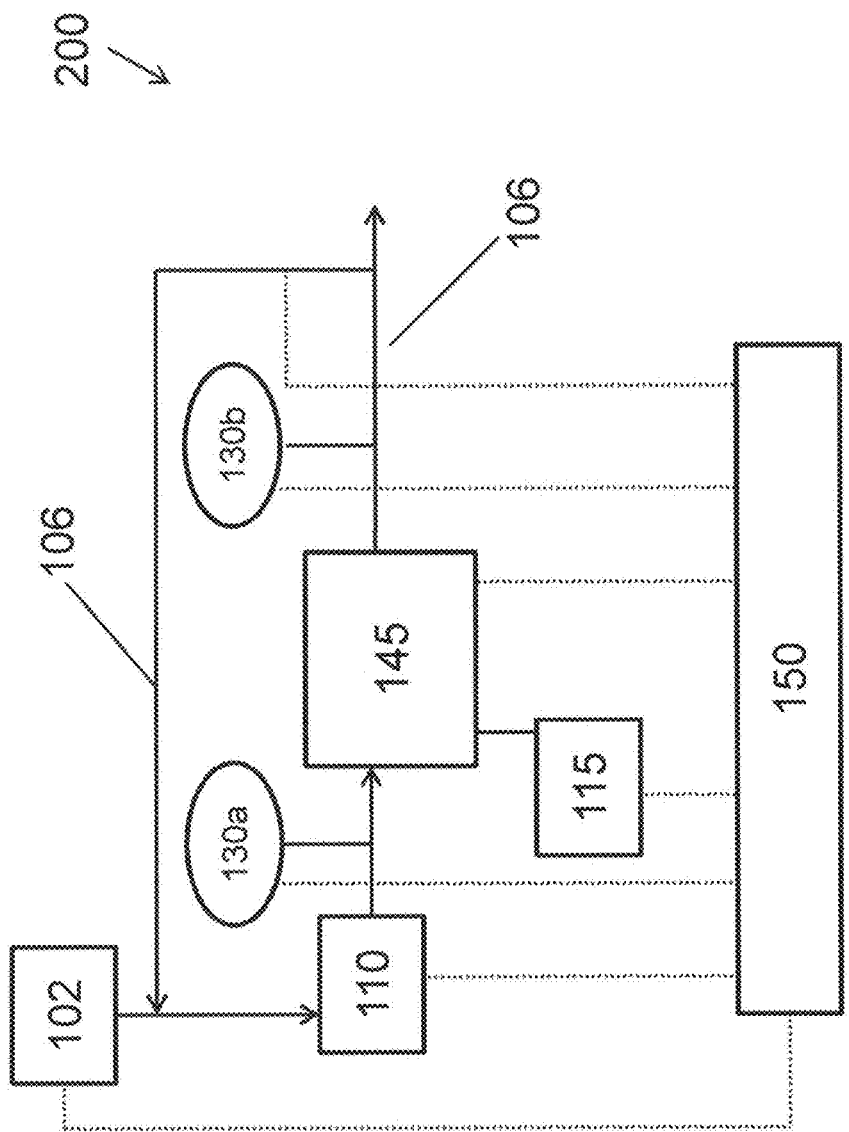

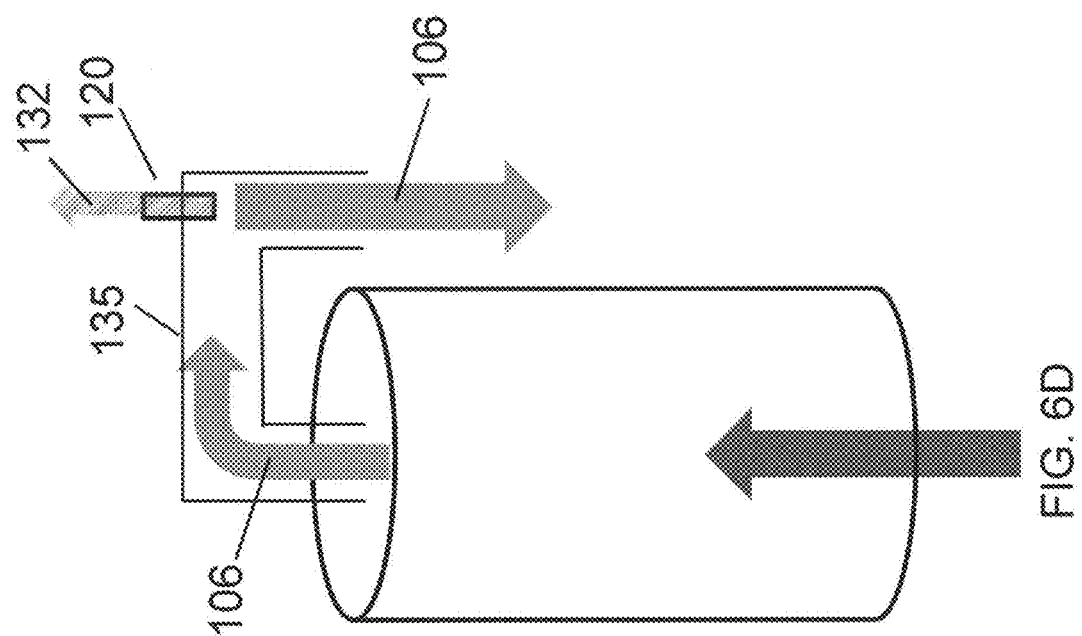

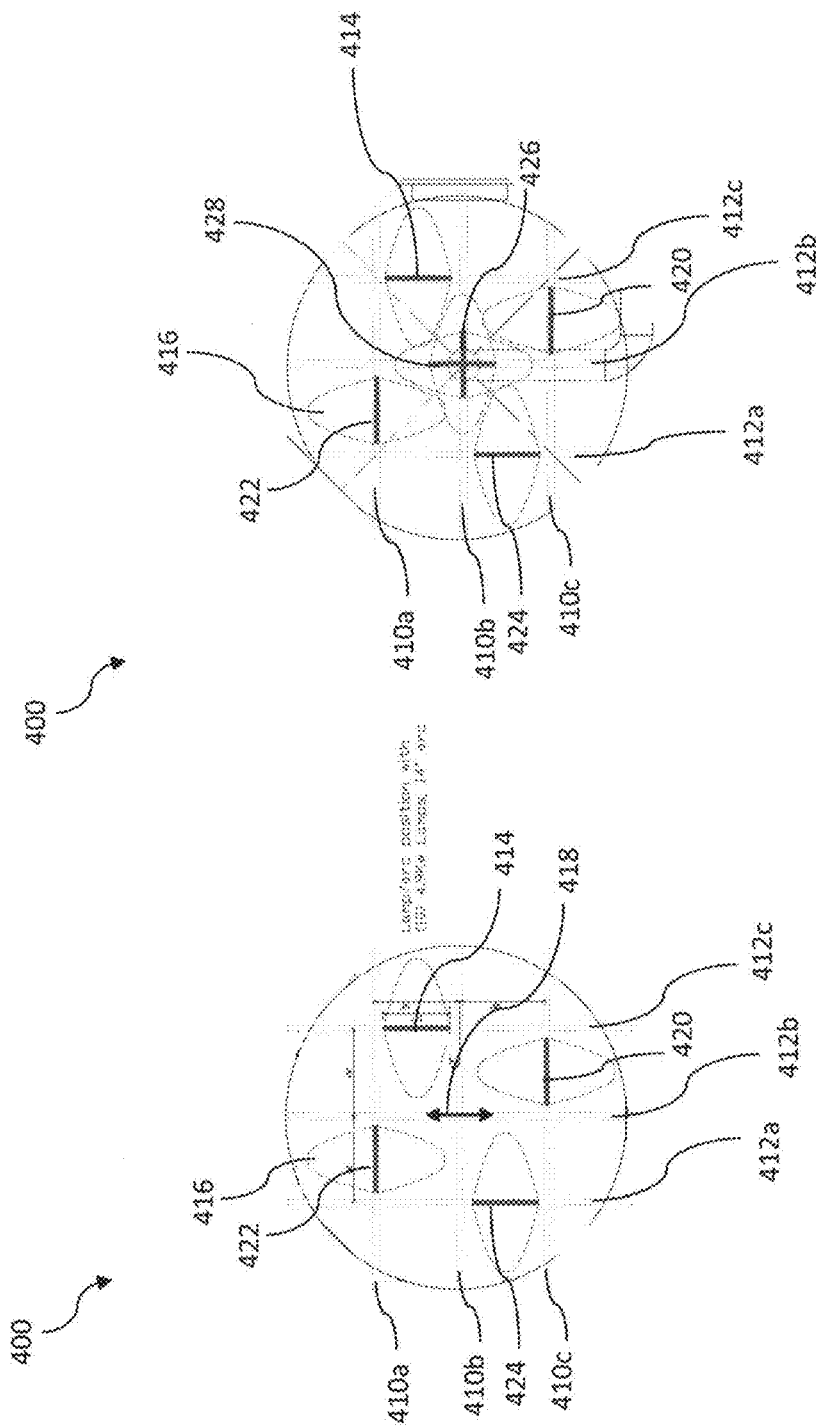

ADVANCED OXIDATION PROCESS METHODS FOR DEGASIFICATION OF REACTOR VESSEL

CROSS REFERENCE TO RELATED APPLICATIONS

This application claims priority under 35 U.S.C. § 119(e) to U.S. Provisional Application Ser. No. 62/158,014, titled "ADVANCED OXIDATION PROCESS METHODS FOR DEGASIFICATION OF REACTOR VESSEL," filed May 7, 2015, which is incorporated herein by reference in its entirety.

BACKGROUND

The presence of organic contaminants in subsurface soils and groundwater is a consistent problem throughout the world. In many countries, certain government regulations require the removal, reduction, destruction, or stabilization of many of these organic contaminants from contaminated sites.

One potential method of remediating such contamination includes biodegradation, which involves using indigenous or introduced (i.e., non-indigenous) bacteria or other microbes to degrade or digest organic chemicals, which in turn produces byproducts such as carbon dioxide and water. Although biodegradation works well for certain organic contaminants, it can be difficult or impossible to biodegrade certain organic contaminants, such as 1,4-dioxane.

1,4-Dioxane, otherwise referred to as simply "dioxane" is a clear liquid that is highly soluble, and thus easily dissolves in water. It is also a biologically stable organic compound, making it difficult to treat with many conventional remediation techniques. 1,4-Dioxane is used primarily as a solvent in the manufacture of chemicals and as a laboratory reagent, and has various other uses that take advantage of its solvent properties. 1,4-Dioxane is a trace contaminant of some chemicals used in cosmetics, detergents, and shampoos. However, manufacturers now reduce 1,4-dioxane from these chemicals to low levels before these chemicals are made into products used in the home.

The Environmental Protection Agency (EPA) identifies the most serious hazardous waste sites in the nation. These sites are then placed on the National Priorities List (NPL) and are targeted for long-term federal clean-up activities. 1,4-Dioxane has been found in at least 31 of the over 1500 current or former NPL sites. Further, the possibility exists that the number of sites at which 1,4-dioxane is found may increase in the future as more sites are evaluated. Since 1,4-dioxane is considered a hazardous material that contaminates ground water, there is a need for a process that will remove 1,4-dioxane from groundwater. Previous attempts to destroy 1,4-dioxiane have included using a combination of hydrogen peroxide and ultraviolet (UV) light, or using ozone in combination with UV light. These processes are not very efficient and may require an additional post treatment step with peroxide to completely remove 1,4-dioxane. For example, the use of ozone may be expensive in terms of both capital and operating costs, and the use of peroxide may require the adjustment of the pH of the incoming feed that is to be treated. Another example of a treatment process includes using a regenerable charred resin material that absorbs 1,4-dioxane. However, this process results in a waste stream that contains concentrated 1,4-dioxane that requires another means of destruction, such as incineration.

SUMMARY

Aspects and embodiments are directed to an ex-situ process for removing organic contaminants from groundwater. One or more aspects of the invention are directed to a method of removing organic contaminants from a groundwater. In some embodiments of the invention, the method can comprise providing a contaminated groundwater having an initial concentration of an organic contaminant, introducing a persulfate to the contaminated groundwater to produce a first treated aqueous solution, exposing the first treated aqueous solution to ultraviolet light to produce a second treated aqueous solution and one or more gases, the second treated aqueous solution having a concentration of the organic contaminant that is less than the initial concentration, and removing the one or more gases generated from exposing the first treated aqueous solution to the ultraviolet light.

According to some embodiments, exposing the first treated aqueous solution comprises introducing the first treated aqueous solution to a reactor vessel. According to at least one embodiment, removing the one or more gases comprises removing the one or more gases from the reactor vessel. In accordance with some embodiments, the one or more gases are removed from the reactor vessel through a degasifier coupled to the reactor vessel. According to another embodiment, removing the one or more gases comprises removing the one or more gases from a conduit exiting the reactor vessel.

In some embodiments, the method may comprise directing the one or more gases and at least a portion of the second treated aqueous solution to a storage device, the storage device configured to remove at least a portion of the one or more gases. According to a further aspect, the method may comprise recirculating at least a portion of the second treated aqueous solution in the storage device to a point upstream from the introduction of the persulfate.

According to some embodiments, the contaminated groundwater is introduced to the reactor vessel at a flow rate of at least 100 gallons per minute. According to at least one embodiment, the contaminated groundwater has an initial TOC concentration of at least 25 ppb.

According to certain embodiments, the method may comprise introducing the contaminated groundwater to a media filter prior to introducing the persulfate.

According to another embodiment, the method may comprise extracting the contaminated groundwater from a remediation site.

One or more aspects of the invention relate to a system for removing organic contaminants from a groundwater. In some embodiments of the invention the system comprises a source of contaminated groundwater having an initial concentration of an organic contaminant, a source of persulfate fluidly connected to the source of contaminated groundwater and configured to introduce a persulfate to the contaminated groundwater, an actinic radiation source fluidly connected to the source of contaminated groundwater and configured to irradiate the contaminated groundwater, and at least one degasifier configured to remove one or more gases from the irradiated groundwater.

According to some embodiments, the system comprises a reactor fluidly connected to the source of contaminated groundwater and the source of persulfate and configured to house the actinic radiation source.

In accordance with certain embodiments, at least one degasifier is coupled to the reactor. According to at least one embodiment, the reactor is oriented horizontally.

According to some embodiments, at least one degasifier is coupled to a conduit exiting the reactor. In accordance with some embodiments, the reactor is oriented vertically.

According to certain embodiments, the system further comprises a storage device positioned downstream from the reactor. At least one degasifier may be coupled to the storage device.

According to another embodiment, at least one degasifier is coupled to a conduit in fluid communication with the source of persulfate.

According to another embodiment, the system comprises a media filter positioned upstream from the source of persulfate.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 1B is a schematic drawing illustrating alternate placements of a degasifier in the system of FIG. 1A in accordance with one or more aspects of the invention;

FIG. 1C is a schematic drawing illustrating further detail of placement of a degasifier in the system of FIG. 1B;

FIG. 2A is a schematic drawing illustrating a system in accordance with one or more aspects of the invention;

FIGS. 6A-6D are schematic drawings illustrating different examples of placement of a degasifier in accordance with one or more aspects of the invention;

FIG. 11A is a schematic drawing illustrating a reactor in accordance with one or more aspects of the invention; and FIG. 11B is a schematic drawing illustrating a reactor in accordance with one or more aspects of the invention.

DETAILED DESCRIPTION

Figure 1A:
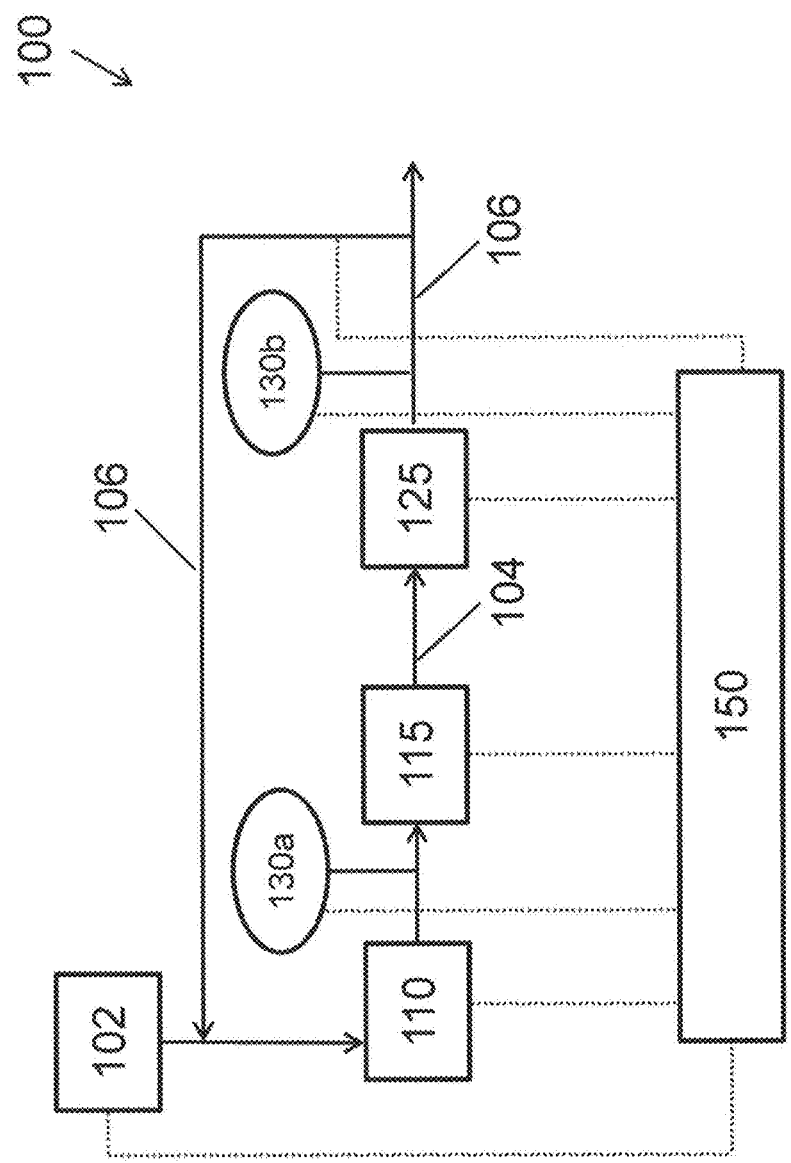
FIG. 1A is a schematic drawing illustrating a system in accordance with one or more aspects of the invention.

One or more aspects of the invention are directed to groundwater treatment systems and methods. According to various embodiments, the systems and methods utilize a persulfate in combination with a source of ultraviolet (UV) light to treat groundwater contaminated with an organic contaminant. In addition, the systems and methods disclosed herein remove one or more gases that are generated from treating the contaminated groundwater with the combination of persulfate and UV light. Non-limiting examples of organic contaminants that may be treated according to the disclosed methods and systems include 1,4-dioxane, trichloroethylene (TCE), perchloroethylene (PCE), urea, isopropanol, chloroform, atrazine, tryptophan, perfluorooctanoic acid (PFOA), and formic acid.

According to some embodiments, a source of persulfate may first be introduced to the contaminated groundwater, which may be followed by exposure of the contaminated groundwater to UV light. According to other embodiments, the persulfate addition and the UV exposure may occur at approximately the same time, i.e., simultaneously or nearly simultaneously. According to various aspects, the persulfate and the UV light function to oxidize the organic contaminant into non-hazardous compounds, including carbon dioxide and water. For example, persulfate and UV may react with organic contaminants (which correlate with total organic carbon (TOC)) as shown below by Equation 1:

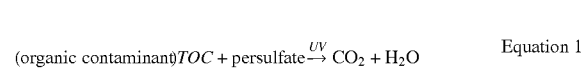

$$(\text{organic contaminant})TOC + \text{persulfate} \xrightarrow{UV} CO_2 + H_2O \quad \text{Equation 1}$$

In accordance with certain aspects, the chemical reaction of persulfate with UV may be expressed as shown below by Equation 2:

$$S_2O_8 \xrightarrow[\text{heat}]{UV} 2\,SO_4^{\bullet-} \quad \text{Equation 2}$$

Further, the free sulfate radicals formed when the persulfate is activated by UV react with the organic contaminants by removing electrons from the organic molecule to produce organic radicals, as shown below in Equation 2A for the carboxylate ion:

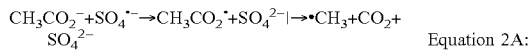

Equation 2A:

The sulfate radical reacts with aromatic or heterocyclic contaminants via an electron transfer mechanism to produce a radical cation, as shown below by Equation 2B:

Equation 2B

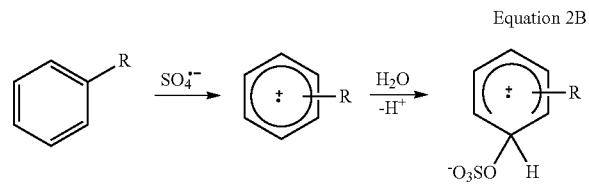

Without being bound by theory, it is believed that the free sulfate radicals are responsible for the oxidation of TOC, either directly, or by reacting with other radicals and oxidants.

According to various aspects, the combination of persulfate with UV light is effective in removing or reducing TOC concentration in groundwater to levels that are set by federal or municipal authorities. In accordance with certain aspects, the treatment of the contaminated groundwater with the persulfate and the UV light may reduce the initial concentration of organic contaminant in the groundwater by at least 50%, and in some instances, may reduce the concentration by at least 90%, or even 100%.

As evidenced by Equation 1 above, the treatment of organic contaminants with persulfate and UV produces gases, such as carbon dioxide ($CO_2$). In addition, decomposition of the persulfate itself or other components present in the system may also create one or more gases. For instance, in applications where ammonium persulfate (APS) is used, the decomposition of APS emits gases such as sulfur oxides, nitrogen oxides, and ammonia. The degradation of APS is shown in Equation 3 below to produce oxygen:

$(NH_4)_2S_2O_8+H_2O \Longrightarrow (NH_4)_2SO_4+H_2SO_4+½O_2$  Equation 3:

Other persulfates also degrade to produce oxygen, as shown below for sodium persulfate (NaPS) according to Equation 4:

$Na_2S_2O_8+H_2O \Longrightarrow Na_2SO_4+H_2SO_4+½O_2$  Equation 4:

APS also degrades to form nitrogen ($N_2$) gas, as shown by Equation 5:

$4(NH_4)_2S_2O_8+H_2O \Longrightarrow 3N_2+(NH_4)_2SO_4+7H_2SO_4+5H_2$  Equation 5:

The persulfate may therefore degrade to generate oxygen (as indicated above) and/or one or more other gases generated from the reaction with TOC, such as $CO_2$, $N_2$, and $H_2$. Furthermore, for feed water having certain levels of alkalinity, the normal degradation of the persulfate into sulfuric acid will cause the sulfuric acid to react with any bicarbonate alkalinity present in the feed water to create $CO_2$ gas, as shown below in Equation 6:

$H_2SO_4+2NaHCO_3 \Longrightarrow SO_4+2H_2O+2CO_2$  Equation 6:

One or more of the gases generated according to the discussion above may cause the water being treated to become supersaturated with one or more gases. The problem may be further exacerbated by increasing the temperature of the water. For instance, UV lamps used to apply the source of UV radiation may also raise the temperature of the water, which generates more gas. For horizontally oriented reactors with process connections mounted on the side, the gas will collect inside the reactor. Thus, unlike systems that treat ultrapure water, treatment of groundwater containing organic contaminants with persulfate and UV can generate significant volumes of one or more of these gases. For instance, depending on the application, TOC levels for ultrapure water may be on the order 25 ppb or less. In contrast, TOC levels in contaminated groundwater can be many orders of magnitude greater than 25 ppb. For instance, depending on the geographical location and the degree of contamination, the contaminated groundwater may have a TOC concentration in a range of about 1-10 ppm. Also, unlike the treatment of ultrapure water, which typically has flow rates of 10-15 gallons per minute, the treatment of contaminated groundwater may have flow rates that are at least 100 gallons per minute, and in certain instances, may be thousands of gallons per minute. This also increase the volume of gas(es) produced. The gases generated from treating the TOC and the degradation of the persulfate and other components can cause detrimental effects on both the process performance and the process equipment. For instance, the gases can cause blinding of the UV lamps, which decreases their effectiveness and may decrease the reaction's efficiency. The gases can also cause the quartz sleeves to overheat, since fluid is no longer flowing past it to help cool the lamps. Overheating of the lamps can cause the sleeves to melt, which can ultimately lead to lamp failure. In addition, the gases take up volume in the reactor vessel, which decreases the volume of material that can flow through the reactor. For instance, the treatment process in the reactor may exhibit plug flow characteristics, and the presence of gas within the reactor may decrease the volume of fluid forming the treated "plug." This slows down the rate at which the process treats the contaminated groundwater. The gas also builds up pressure in the reactor or conduit that holds the fluid being treated, which damages the quartz tubes that contain the UV lamps. One or more aspects of the invention are directed to removing these gases from the treatment system, including the reactor vessel and conduits leading to and from the reactor vessel.

One or more embodiments involve methods and systems for treating groundwater contaminated with one or more organic compounds. As used herein, the term "groundwater" may refer to water recovered from subterranean sources as well as water recovered from surface bodies of water, such as streams, ponds, marshes, creeks, ditches, marshes, and other similar bodies of water. The groundwater may be contaminated with one or more organic contaminants as discussed above. The groundwater may have become contaminated from any one of a number of different sources, such as industrial processes, agricultural processes, such as pesticide and herbicide applications, or other processes, such as disinfection processes that produce undesirable byproducts such as trihalomethanes.

According to at least one embodiment, the systems and methods may include providing a contaminated groundwater having an initial concentration of an organic contaminant. In some embodiments, the contaminated groundwater may be extracted or otherwise removed. For instance, the contaminated groundwater may be pumped from the ground or other sources using one or more pumps or other extraction devices as part of a remediation effort. Once treated, the groundwater may then be pumped back into the ground or sent on for further processing. According to some embodiments, the contaminated groundwater is pumped or otherwise removed to the surface grade level where it may then be treated according to the processes and methods discussed herein. For instance, the contaminated groundwater may be extracted from a remediation site and then treated. In one embodiment, one or more extraction wells and extraction equipment, such as pumps, may be used for pumping contaminated groundwater to the surface to be treated. Once treated, a pump or other distribution system may be used to re-inject the treated groundwater back into the ground or otherwise re-introduce the treated groundwater back into the environment. In certain instances, the contaminated groundwater may be stored in a holding tank or vessel prior to treatment, and in some cases, treated water produced by the processes disclosed herein may be added or otherwise mixed with the contaminated groundwater. The systems and methods disclosed herein may therefore be in fluid communication with a source of contaminated groundwater. For instance, the contaminated groundwater may be pumped or otherwise delivered to the disclosed system for treatment.

According to various aspects, the initial concentration of organic contaminant in the groundwater is high enough o exceed limits established by an industrial application and/or by government agencies. According to some embodiments, the systems and methods disclosed herein reduce the concentration of the organic contaminant to a level that complies with industry standards and/or government standards or guidelines. According to one embodiment, the concentration of organic contaminant is reduced to a level such that the treated groundwater may be reintroduced back into the environment. For instance, the EPA's standard for the concentration of 1,4-dioxane in drinking water is 1 g/L (1 ppb). The systems and methods disclosed herein may be scaled to treat substantially all concentrations of organic contaminant that may be present in the groundwater. According to at least one embodiment, the initial concentration of organic contaminant, such as dioxane, may be in a range from about 5 ppb to about 800 ppb.

Although the examples discussed herein are directed to groundwater contamination, the disclosed methods and systems may also be used to treat contaminated water from other sources, such as water from labs, industries, manufacturing, hospitals, residential sources, etc.

In accordance with at least one aspect of the invention, a persulfate may be introduced to the contaminated groundwater. As used herein, the term "persulfate" is used in reference to a composition that when combined with an aqueous solution contributes at least one of the peroxomonosulfate (or peroxymonosulfate) ion $SO_5^{-2}$ and the peroxodisulfate (or peroxydisulfate) ion $S_2O_8^{-2}$. Non-limiting examples of persulfate include alkali and alkali metal persulfates such as sodium persulfate, potassium persulfate, and any other Group I metal persulfate, and ammonium persulfate, peroxydisulfate salts such as alkali and alkali metal peroxydisulfate and ammonium peroxydisulfate, acids such as peroxydisulfuric acid, peroxymonosulfuric acid or Caro's acid, as well as combinations thereof. According to certain aspects, the persulfate may be stored in a tank or other vessel and introduced to the contaminated groundwater through a controllable valve or other controllable conduit such that the rate of persulfate introduced to the contaminated groundwater may be controlled.

According to another aspect of the invention, the contaminated groundwater may be exposed to a source of UV light. For instance, the methods and systems disclosed herein may include the use of one or more UV lamps, where each lamp emits light at a desired wavelength in the UV range of the electromagnetic spectrum. For instance according to one embodiment, the UV lamp may have a wavelength ranging from about 180 to about 280 nm. According to another embodiment, the UV lamp may have a wavelength ranging from about 185 nm to about 254 nm.

In accordance with some embodiments, the contaminated groundwater may have a level of total dissolved solids (TDS) that is in a range of about 100 mg/L to about 5000 mg/L, and in some instances, may be in a range of about 200 mg/L to about 2000 mg/L, although these values can vary depending on the geographic location and other factors. As a source of comparison, water with a TDS level of 1000-1500 mg/L is considered drinkable, with some standards having a 500 mg/L TDS limit for domestic water supplies. According to at least one embodiment, the contaminated groundwater may be treated to reduce the level of TDS, such as by performing a filtration technique.

In accordance with one or more embodiments, a method for treating groundwater may be provided. The method can comprise providing a contaminated groundwater having an initial concentration of an organic contaminant. The method also comprises introducing a persulfate to the contaminated groundwater to produce a first treated aqueous solution and exposing the first treated aqueous solution to ultraviolet light to produce a second treated aqueous solution. In some embodiments, the second treated aqueous solution has a concentration of organic contaminant that is less than the initial concentration of organic contaminant. The method also comprises removing one or more gases generated from exposing the contaminated groundwater to the source of persulfate and the UV light.

In accordance with at least one embodiment, the method comprises removing the one or more gases generated from treating the contaminated groundwater with persulfate and UV from a reactor vessel. In one embodiment, the one or more gases are removed from the reactor vessel through a degasifier coupled to the reactor vessel. As used herein, the term "degasifier" (also referred to as a gas eliminator, degasser, or deaerator) may refer to any mechanical device or structure that is capable of transferring or otherwise removing gas from one or more components of the treatment system, such as a reactor or conduit or storage tank. One example of a type of degasifier that may be used is a float valve device, such as the float valve devices discussed below in reference to FIG. 3 and FIGS. 4A and 4B. Examples of suitable degasifiers for one or more of the systems and methods discussed herein are commercially available from Watson McDaniel, Inc. of Pottstown, Pa., such as the AE1800 model series. Such float valve devices may include a float mechanism that actuates a valve opening under a certain pressure of gas. According to another embodiment, one or more gases are removed upstream or downstream from the reactor vessel. For instance, a degasifier may be coupled to a conduit that is in fluid communication with an inlet or outlet of the reactor. According to another embodiment, at least a portion of the second treated aqueous solution and/or the one or more gases may be directed to a point upstream from the introduction of the persulfate. In one embodiment, at least a portion of the second treated aqueous solution and the one or more gases are directed to a storage device that is configured to remove at least a portion of the one or more gases. At least a portion of the second treated aqueous solution in the storage device may be directed to a point upstream from the introduction of the persulfate. According to some embodiments, the one or more gases and at least a portion of the second treated aqueous solution are directed upstream from the introduction of the persulfate. In some embodiments, the one or more gases and at least a portion of the second treated aqueous solution are directed to a unit operation positioned either internal or external to the treatment system. For instance, according to one embodiment, the one or more gases and at least a portion of the second treated aqueous solution are directed to a unit operation positioned upstream from the introduction of the persulfate. Recycling or recirculating allows for the opportunity to use the gas and/or and the second treated aqueous solution in the treatment process and/or in other processes or devices.

One or more embodiments may include a system for treating contaminated groundwater. The system may comprise a source of contaminated groundwater having an initial concentration of organic contaminant and a source of persulfate fluidly connected to the source of contaminated groundwater. The source of persulfate may be configured to introduce a persulfate to the contaminated groundwater, and an actinic radiation source that is fluidly connected to the source of contaminated groundwater and is configured to irradiate the contaminated groundwater. The system also comprises at least one degasifier. In some embodiments, the degasifier is configured to remove one or more gases from the irradiated groundwater. In other embodiments, the degasifier is configured to remove one or more gases from the source of persulfate before it is introduced to the contaminated groundwater.

According to some embodiments, a reactor may be fluidly connected to the source of contaminated groundwater and the source of persulfate, and the reactor may be configured to house the actinic radiation source. When one or more gases are emitted from the fluid being treated within the reactor, a degasifier coupled to the reactor removes the gas from the reactor. The gas may be ejected to the atmosphere or recycled to another unit operation. The degasifier may also transfer the gas through a gas scrubber unit for further processing. For instance, a gas scrubber may remove substances that are harmful to the environment before ejecting the gas into the open environment or transferring the gas to another unit operation.

According to other embodiments, a degasifier may be positioned in one or more locations in the treatment system. For instance, a degasifier may be coupled to a conduit that is in fluid communication with an inlet or an outlet of the reactor. According to another example, a degasifier may be coupled to a storage device positioned downstream from the reactor. For instance, when treated groundwater and gas emitted from the reactor are transferred to the storage device, the gas may be removed from the storage device through the degasifier. In other embodiments, the storage device may be open to the atmosphere and the gas may be emitted to the atmosphere without the aid of a separate degasifier device attached to the storage device.

In accordance with various aspects, the system may include one or more sensors or other measurement devices positioned at one or more locations in the system. For instance, according to some embodiments, the system may include at least one of a TOC concentration sensor, a TDS sensor, an alkalinity sensor, such as an alkalinity sensor for measuring $CaCO_3$, other concentration sensors for measuring specific species such as persulfate, $CO_2$, oxygen, nitrogen, ozone, and/or sulfur dioxide, a pH sensor, a flow rate sensor, a resistivity sensor, and/or any other suitable type of measurement device for performing desired functions of the systems and methods disclosed herein. The system may also include a controller that is in communication with the one or more sensors. For example, a controller may be in communication with at least one TOC concentration sensor that is configured to control at least one of a rate at which the persulfate is introduced to the contaminated groundwater and a dose of irradiation applied by the actinic radiation source based on an output signal from the TOC concentration sensor. Suitable example for TOC sensors that may be used in accordance with one or more embodiments disclosed herein include the Sievers M9 or M9e TOC analyzers from GE Analytical Instruments of Boulder, Colo.

According to at least one embodiment, the contaminated groundwater may be pretreated. In accordance with various aspects, the contaminated groundwater may be pretreated prior to the introduction of persulfate. Pretreatment may function to remove any one or more undesirable components from the contaminated groundwater, such as substances that may interfere with the processes and systems disclosed herein. For example, pretreatment may involve a water disinfectant process, a sediment removal process, or the removal of any other undesired component, such as a water deionization process. In accordance with at least one embodiment, pretreatment may be performed using a media filter, as described further below. According to other embodiments, pretreatment may be performed by adding or otherwise exposing the contaminated groundwater to one or more pretreatment substances. For instance, chlorine may be added as a disinfectant to the contaminated groundwater.

In accordance with at least one embodiment, the methods and systems disclosed herein include a media filter. The media filter may function to remove any one or more undesirable components from the contaminated groundwater, such as dissolved solids or particulates which may interfere with the function of the UV light or clog components of the filtration system.

The media filter may be any one of a number of different types of media filters, including a particulate filter, such as a screen filter, sand filter, a bag filter, or a filter cartridge, and may contain one or more types of media, such as, activated carbon or other carbons, nut shells, sand, resins, and other types of adsorbents. For example, the media filter may function to remove particulates or otherwise reduce the turbidity of the contaminated groundwater. For instance, the media filter may be used to reduce the level of total dissolved solids (TDS) in the contaminated groundwater. According to some embodiments, the media filter may contain ion exchange resin. The ion exchange resin may function to reduce the hardness of the contaminated groundwater. For example, in certain instances a mixed bed deionizer may be used in the systems and methods disclosed herein. A mixed bed deionizer uses both cation and anion regenerative ion exchange resin beads, which are mixed together to remove impurities. The mixed bed deionizer allows water to make repeated contact with the cation and anion beads, and remove or reduce the concentration of undesirable ions in the contaminated groundwater through the process of ion exchange.

Other non-limiting examples of pretreatment devices include reverse osmosis devices, electrodialysis devices, electrodeionization devices, and distillation devices. The pretreatment device may also be placed at one or more locations in the process where a device with a particular functionality may be desired. For instance, an additional media filter may be positioned in the recirculating loop of the second treated aqueous solution.

FIG. 1A schematically embodies a system 100 in accordance with one or more embodiments of the invention. According to various aspects, system 100 can be representative of a water treatment system that removes organic contaminants from contaminated groundwater. According to some embodiments, system 100 may be a water treatment system that reduces a concentration, content, or level of one or more impurities or contaminants that may be present in contaminated groundwater. In at least one embodiment, groundwater that has been treated by system 100 may be reintroduced to the environment. According to other embodiments, groundwater that has been treated by system 100 may be further processed in downstream processing operations or recycled for use in other unit operations. According to various aspects, system 100 is representative of a system that includes a sequential treatment method, whereby persulfate is introduced to the contaminated groundwater prior to exposure to UV light, and may include a series of conduits where the contaminated groundwater is transported from one treatment operation to the next. In contrast, FIG. 2A exemplifies a system 200 that is discussed in further detail below whereby a reactor 145 is used to combine the persulfate and UV treatment in one vessel.

As shown in FIG. 1A, system 100 may comprise a source of contaminated groundwater 102 that has an initial concentration of organic contaminant, a media filter 110, a source of persulfate 115, a source of UV light 125, otherwise referred to herein as UV reactor 125, one or more sensors 130a and 130b, which in some embodiments may be TOC concentration and/or alkalinity sensors, and a controller 150.

According to some embodiments, the contaminated groundwater 102 may be pretreated by passing it through the media filter 110 to remove any one or more undesired species, such as particulates or ionic species. The media filter 110 may be provided and characterized as discussed above. Although not shown, other pretreatment devices may also be used to pretreat the contaminated groundwater 102 besides the media filter 110, such as pretreatment devices that disinfect the contaminated groundwater 102. According to some embodiments, the treatment system may not include a media filter and may include some other type of pretreatment device, and in certain instances, no pretreatment device is used to pretreat the contaminated groundwater.

A source of persulfate 115 may be introduced to the contaminated groundwater 102 to produce a first treated aqueous stream 104. The source of persulfate 115 may be any one or more persulfate species as described above, and may be introduced to the groundwater in a number of different ways. For example, the source of persulfate may be dispensed through a valve through a conduit that is connected to a conduit containing the contaminated groundwater. As discussed herein, the source of persulfate 115 may be controlled by the controller 150. According to some embodiments, the introduction of persulfate 115 may be adjusted and controlled based on characteristics or measured or calculated parameters of the system, such as measured parameters of the inlet contaminated groundwater or treated water, and/or water that has been treated by the persulfate and UV. Non-limiting examples of these measured parameters include TOC concentration, persulfate concentration, temperature, and flow rate. For instance, the rate at which the persulfate 115 is introduced to the contaminated groundwater or the concentration level of the persulfate 115 that is introduced to the contaminated groundwater may be controlled by the controller 150 based on a measured TOC value of water taken by sensor 130a. The control of the rate at which persulfate 115 is introduced may be accomplished through the use of one or more flow control devices, such as a valve or pump. The source of persulfate may be stored locally in a tank or vessel and pumped through one or more pumps, valves, and conduits to be introduced to the contaminated groundwater. The persulfate 115 may be introduced at a certain concentration level to the contaminated groundwater. For instance, according to some embodiments, the persulfate 115 may be added at a concentration level in a range from about 1 ppb to about 1000 ppb/ppb TOC (i.e., the initial concentration that may be measured by sensor 130a), and in some embodiments, the persulfate may be added at a concentration level in a range from about 1 ppb to about 500 ppb per ppb TOC. In other embodiments persulfate may be added at a concentration level in a range from about 1 ppb to about 200 ppb. As will be understood, the concentration level of persulfate may be dependent on a number of different factors, including the type of application, the type of contaminant, and/or the concentration of contaminant in the groundwater. For instance, the concentration level of persulfate may be a function of various design parameters, including residence time, reactor dimensions, UV lamp characteristics, TOC composition and concentration, as well as other factors including capital and operating costs, and the available footprint.

The first treated aqueous solution 104 generated from introducing the persulfate 115 to the contaminated groundwater 102 may be further exposed to a source of ultraviolet light 125 to produce a second treated aqueous solution 106. According to some embodiments, the source of ultraviolet light 125 may be characterized as an actinic radiation source, otherwise referred to herein as an actinic radiation reactor or as simply a reactor. The actinic radiation reactor can comprise a vessel that includes one or more arrays of tubes that each contain at least one UV lamp. The ultraviolet lamps may be positioned within quartz sleeves or tubes that protect the lamp from fluids, as discussed in further detail below. In addition, the reactor may be constructed from corrosion-resistant material such as stainless steel.

According to some embodiments, the actinic radiation reactor may comprise a first array of tubes in the vessel. The first array of tubes can comprise a first set of parallel tubes, and a second set of parallel tubes. Each of the parallel tubes of the first set may be positioned to have its longitudinal axis orthogonal relative to the longitudinal axis of the tubes of the second set. According to some embodiments, one or more tubes are arranged in parallel to the longitudinal axis of the reactor. For instance, the first treated aqueous solution 104 may pass through an actinic radiation reactor that comprises one or more parallel tubes that are positioned parallel to the longitudinal axis of the reactor. The first treated aqueous solution 104 may enter one end of the reactor and flow along the longitudinal axis to the other end of the reactor, and thereby be exposed to UV light, i.e., a path oriented configuration. According to other embodiments, a cross flow configuration is used.

Commercially available sources of actinic radiation systems include those from, for example, Quantrol, Naperville, Ill., as the AQUAFINE® UV system, and from Aquionics Incorporated, Erlanger, Ky.

In certain embodiments, the ultraviolet lamps can be operated at one or more illumination intensity levels. For example, one or more lamps can be used that can be adjusted to operate at a plurality of illumination modes, such as at any of dim, rated, and boost mode, for example, a low, medium, or high mode. The illumination intensity of one or more lamps can be adjusted and controlled based on characteristics or measured or calculated parameters of the system, such as measured parameters of the inlet contaminated groundwater or treated water, such as water that has been treated by the persulfate and UV. Non-limiting examples of these measured parameters include TOC concentration, persulfate concentration, temperature, and flow rate. The illumination intensity of one or more lamps can also be adjusted and controlled based on the concentration or amount of persulfate added to the system. For example, the one or more lamps can be used in a dim mode up to a predetermined threshold value of a measured parameter of the system, such as a first TOC concentration. The one or more lamps can be adjusted to a rated mode if the measured or calculated TOC concentration reaches or is above a second TOC concentration, which may be above the threshold value. The one or more lamps can further be adjusted to a boost mode if the measured or calculated TOC concentration reaches or is above a second threshold value.

Although not explicitly shown, system 100 may also include an in-line mixer that functions to mix the contaminated groundwater 102 with the source of persulfate 115 prior to being exposed to the source of UV light 125. This may ensure even distribution of the persulfate species throughout the contaminated groundwater 102 and allow for a more efficient process when UV light is applied.

System 100 of FIG. 1A may also include one or more degasifiers. FIG. 1B is a schematic illustration of three examples for different placement of a degasifier 120 within system 100 that are labeled 120a, 120b, and 120c. Degasifier 120 may be positioned at one or more of the illustrated locations of FIG. 1B. For instance, FIG. 1B shows system 100 where degasifier 120a is coupled to the source of persulfate 115, degasifier 120b is coupled or otherwise attached to the UV reactor 125, and degasifier 120c is attached or otherwise coupled to a conduit 135 that is in fluid communication with an outlet of UV reactor 125. For instance, if residual gas remains in the exiting treated stream, degasifier 120c may be used to remove these gases downstream from the outlet of the UV reactor 125.

FIG. 1C is a schematic illustrating further detail of degasifier 120a. As shown, a source of persulfate 115 is fed horizontally to a "T" and is then directed downward to be introduced to the contaminated groundwater 102. Degasifier 120 a may be positioned at the "T" where one or more gases from either the source of persulfate (such as dilute persulfate that degrades to form oxygen and/or nitrogen according to Equations 3 and 5 above) or from the contaminated groundwater 102 may be allowed escape the system. Instead of a "T" junction as illustrated in FIG. 1C (and FIG. 2C discussed further below), the conduit lines that introduce the source of persulfate 115 may be sloped downward and the degasifier 120 may be positioned at one or more locations on the slope to remove any gases that build up. According to some embodiments, one or more gases present in the contaminated groundwater may also escape through degasifier 120a. As will be appreciated, one or more degasifiers may be oriented or otherwise configured to allow for gases from the source of persulfate 115 and/or the contaminated groundwater 102 to escape.

FIG. 2A schematically embodies a system 200 in accordance with one or more aspects of the invention. Like system 100 of FIG. 1A, system 200 can be representative of a water treatment system that removes organic contaminants from contaminated groundwater. As such, system 200 may be a water treatment system that reduces a concentration, content, or level of one or more impurities or contaminants that may be present in contaminated groundwater, and according to at least one embodiment, groundwater that has been treated by system 200 may be reintroduced to the environment. According to other embodiments, groundwater that has been treated by system 200 may be further processed in downstream processing operations. According to various aspects, system 200 is representative of a system that includes a batch treatment method, whereby persulfate 115 is introduced to a reactor 145 that contains the contaminated groundwater 102 and the reactor 145 houses or otherwise includes a source of UV light. According to various aspects, the reactor 145 allows for the option of sequential treatment, i.e., the introduction of persulfate 115 followed by UV exposure, or simultaneous treatment, i.e., persulfate and UV light exposure are performed at the same time.

As shown, system 200 is similar to system 100 and may comprise a source of contaminated groundwater 102 that has an initial concentration of organic contaminant, a media filter 110, a source of persulfate 115, one or more sensors 130a and 130b, and a controller 150. However, system 200 includes a reactor 145 where one or more treatment operations involving persulfate 115 may occur. According to some embodiments, the reactor 145 may be configured as an irradiation reactor that is fluidly connected to the contaminated groundwater 102. For example, the reactor 145 may house or otherwise include an actinic radiation source and may be configured as an actinic radiation reactor as discussed above.

One or more lamps can be utilized in the reactor 145 to illuminate or irradiate the fluid contained therein. Particular embodiments of the invention can involve one or more reactors having a plurality of lamps, each advantageously disposed or positioned therein to irradiate the water with one or more illumination intensity levels for one or a plurality of illumination periods. Further aspects of the invention can involve utilizing the one or more lamps within any of the reactors in configurations that accommodate or facilitate a plurality of simultaneous illumination intensities.

Contaminated groundwater 102 may thus enter reactor 145, where it comes into contact with a source of persulfate 115 and is exposed to the source of actinic radiation. This treated water exits the reactor 145 as the second treated aqueous solution 106. Thus, the first treated aqueous solution 104 generated by the source of persulfate 115 in system 100 of FIG. 1A is present in the reactor 145 of system 200.

Reactor 145 may be a plug flow reactor or a continuously stirred tank reactor, or combinations thereof. In certain embodiments, a plug flow reactor can be used to prevent the likelihood of blinded or regions of lower irradiation intensity, such as short circuiting, of illumination by the lamps within the reactor. A plug flow reactor can be defined as a reactor that operates under conditions that facilitate laminar flow paths of fluid through the reactor, having parallel, non-turbulent flow paths. Reactor 145 may be sized to provide a residence time sufficient to allow the persulfate and actinic radiation source degrade or otherwise convert the organic contaminants into one or more inert compounds.

The reactor 145 may additionally be sized based on the expected flow rate of the system to provide a sufficient or a desired residence time in the reactor. In certain embodiments, the flow rate of water through the system can be based on the demand for treated water downstream of the system, or the flow rate of water being utilized upstream of the system, or both. In certain examples, the flow rate of water through the system, or through each reactor, can be between about 1 gallon per minute (gpm) and 3200 gpm. As will be appreciated, the flow rate will depend on a variety of factors, including the application, the size of the system, and the type of contaminant being treated. The flow rate may also depend on other factors included in the system, such as the temperature of a reactor housing the source of UV light. For instance, the flow rate may be increased so as to not have the reactor overheat. Further, the reactor and other unit operations and equipment of the system, such as pumps and flow valves, can be selected and sized to allow for fluctuations or changes in flow rates.

The reactor 145 may include a single chamber or may be divided into one or more chambers by one or more baffles between the chambers. The baffle can be used to provide mixing or turbulence to the reactor or prevent mixing or promote laminar, parallel flow paths through the interior of the reactor, such as in the one or more chambers. In certain instances, a reactor inlet may be in fluid communication with a first chamber and a reactor outlet may be in fluid communication with a second chamber.

According to at least one embodiment, the reactor 145 includes a single chamber having at least one UV lamp disposed to irradiate the contaminated groundwater with light of 185 nm, 220 nm, or 254 nm, or ranging from about 185 nm to about 254 nm. According to other embodiments, the reactor 145 is divided into multiple chambers. For example, according to some embodiments, at least three reactor chambers are serially arranged in reactor 145, each having at least one ultraviolet (UV) lamp disposed to irradiate the water in the respective chambers with light of about 185 nm, 220 nm, and/or 254 nm, or ranging from about 185 nm to about 254 nm, at various power levels. According to other embodiments, sets of serially arranged reactors may be arranged in parallel. For example, a first set of reactors in series may be placed in parallel with a second set of reactors in series, with each set having three reactors, for a total of six reactors. Any one or more of the reactors in each set may be in service at any time. In certain embodiments, all reactors may be in service, while in other embodiments, only one set of reactors is in service. Similar configurations for the UV lamp may also be used in UV reactor 125.

System 200 may also include one or more degasifiers 120. For example, FIG. 2B shows three examples (120a, 120b, and 120c) for placement of a degasifier 120 within system 200. Degasifier 120a is coupled to the source of persulfate 115, degasifier 120b is coupled or otherwise attached to the reactor 145 in a similar fashion as discussed above with respect to reactor 125, and degasifier 120c is attached or otherwise coupled to a conduit 135 that is in fluid communication with an outlet of reactor 145.

Figure 2C:
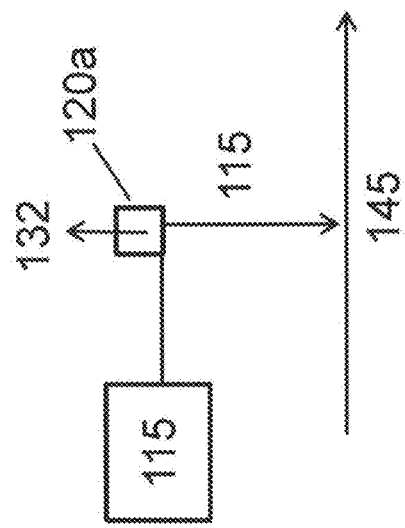
FIG. 2C is a schematic drawing illustrating further detail of placement of a degasifier in the system of FIG. 2B.
Figure 2B:
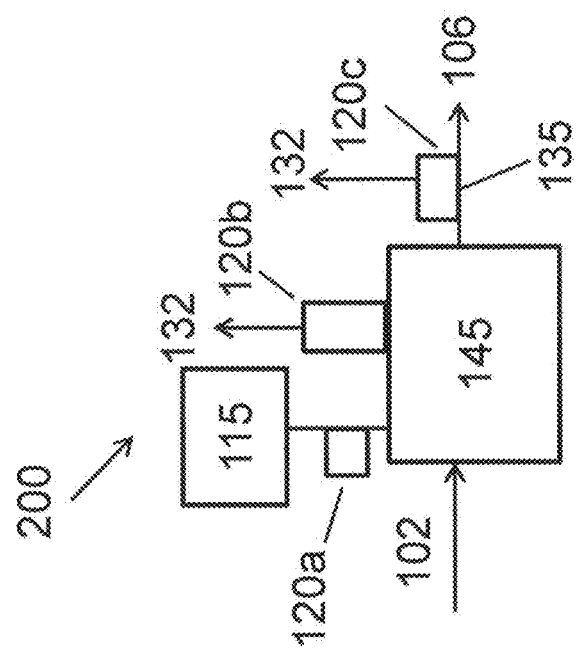
FIG. 2B is a schematic drawing illustrating alternate placements of a degasifier in the system of FIG. 2A in accordance with one or more aspects of the invention.

FIG. 2C is similar to FIG. 1C and illustrates further detail of degasifier 120a. Degasifier 120 a operates in a similar manner as degasifier 120a as discussed above, however, in this example the source of persulfate 115 is directed downward and introduced to the reactor 145 instead of a conduit of contaminated groundwater 102.

Figure 3:
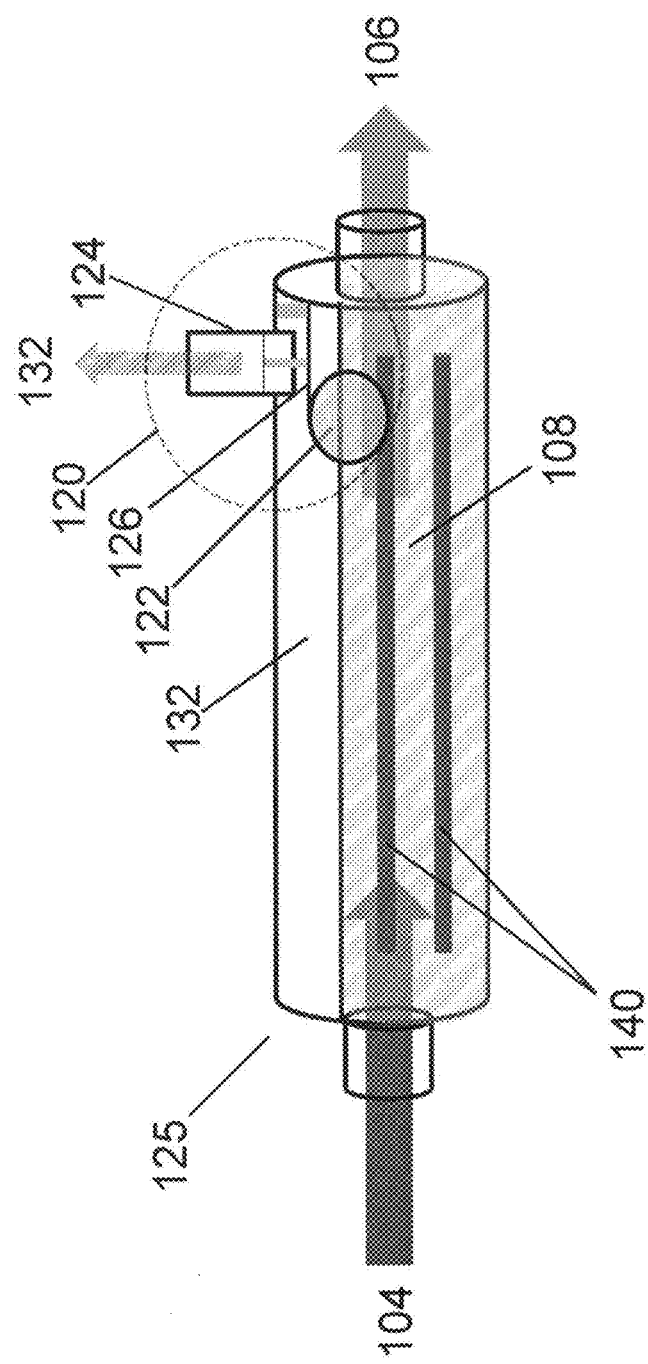
FIG. 3 is a schematic drawing illustrating one example of a reactor vessel with a degasifier in accordance with one or more aspects of the invention.

FIG. 3 is a schematic illustration of one example of a degasifier 120 that may be used with UV reactor 125. According to this example, the UV reactor 125 is oriented horizontally, meaning that the longitudinal axis of the UV reactor 125 is substantially parallel to a horizontal line, i.e., the ground. One or more UV lamps 140 are also positioned within the UV reactor 125 and oriented horizontally. The embodiment of FIG. 3 depicts the degasifier 120 coupled to an upper portion of the sidewall of the UV reactor 125, near the region of the reactor where the second treated aqueous solution 106 exits the vessel. Since gas is less dense than liquid, it will reside in the upper portion of the UV reactor 125, and as water flows through the vessel, it will "drag" the gas bubble along with it to the downstream side of the vessel, where it will accumulate. Therefore the position of the degasifier shown in FIG. 3 may be advantageous for removing the gas 132. The embodiment of FIG. 3 may also be used for reactor 145 of FIG. 2, with the main difference being that a source of persulfate 115 is introduced directly to the reactor 145.

The degasifier 120 of FIG. 3 includes a float and lever mechanism. This type of mechanism includes a hollow sealed float 122 that connects to a lever arm 126 that couples to a degasifier outlet 124, which can be a valve formed in the sidewall of the UV reactor 125 and functions as a seal. The float 122 rests on the surface of the liquid flowing through the UV reactor 125, which in this instance is the aqueous solution being treated. Once the first treated aqueous solution 104 enters the UV reactor 125, it is exposed to UV light emitted from the one or more UV lamps 140. The resulting reaction generates one or more gases 132, such as carbon dioxide that begins to fill the internal volume of the UV reactor 125. Other gases may also be formed, such as oxygen, nitrogen, etc. as discussed above. When the volume of gas 132 in the UV reactor 125 is below a certain threshold, the level or volume of fluid in the UV reactor 125 is greater, which causes the float 122 to lift, and the degasifier outlet 124 remains sealed shut. As more and more gas 132 is generated, the liquid level drops, causing the float 122 to drop. Once the volume of gas 132 reaches a certain threshold, the float is in a "down" position, which causes the degasifier outlet 124 to open and allow the gas 132 to escape, as shown in FIG. 3A. According to some embodiments, the degasifier 120 does not require any external source of power or control. The degasifier 120 may be self-actuating, meaning it opens and closes without any external source of control. Once exposed to the requisite dose of UV treatment, the second treated aqueous solution 106 exits the UV reactor 125.

Figure 4A:
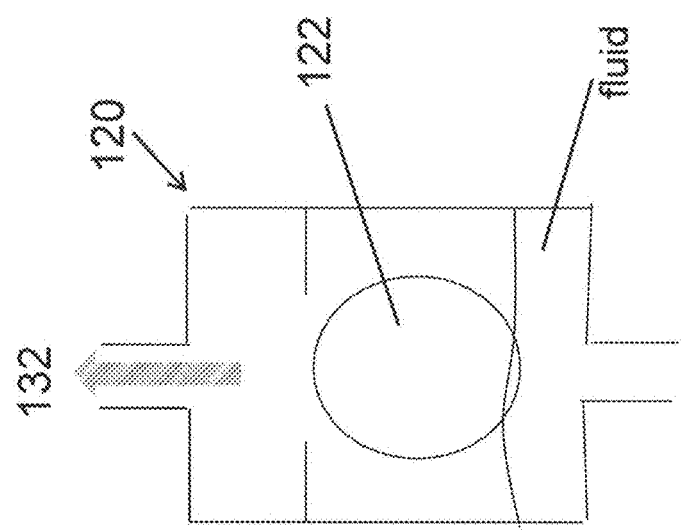
FIG. 4A is a schematic drawing illustrating an operation mechanism of a degasifier in accordance with one or more aspects of the invention.
Figure 4B:
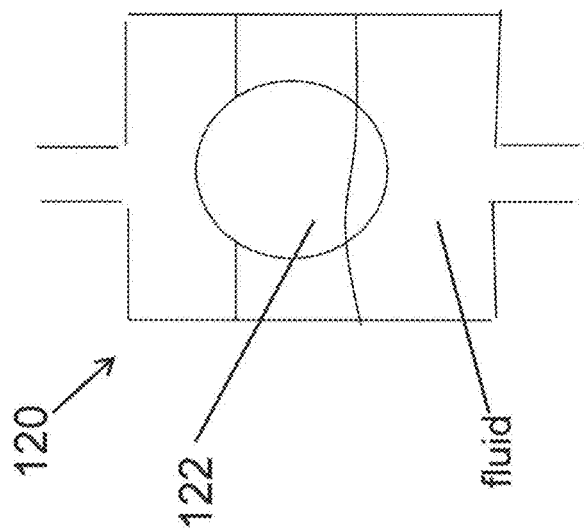
FIG. 4B is a schematic drawing illustrating another operation mechanism of the degasifier of FIG. 4A.

FIGS. 4A and 4B are schematics that illustrate the operation of a degasifier 120 in a closed (FIG. 4A) and an open (FIG. 4B) position. Unlike the float and lever degasifier example shown in FIG. 3, the float valve degasifier 120 of FIGS. 4A and 4B is designed to be integrated into the vessel or conduit itself, such that the float 122 resides within the degasifier 120, as opposed to within the reactor vessel or conduit. As shown in FIG. 4A, when the fluid level rises, the float 122 also rises, which prevents the loss of any fluid from the system. In the "open" position shown in FIG. 4B, the fluid level drops as the volume of gas increases, causing the float 122 to drop and allowing the gas 132 to escape out of the degasifier 120. The degasifier of FIGS. 4A and 4B may be used at one or more locations in either system 100 of FIG. 1A or system 200 of FIG. 2A, depending on the desired application.

Figure 5:
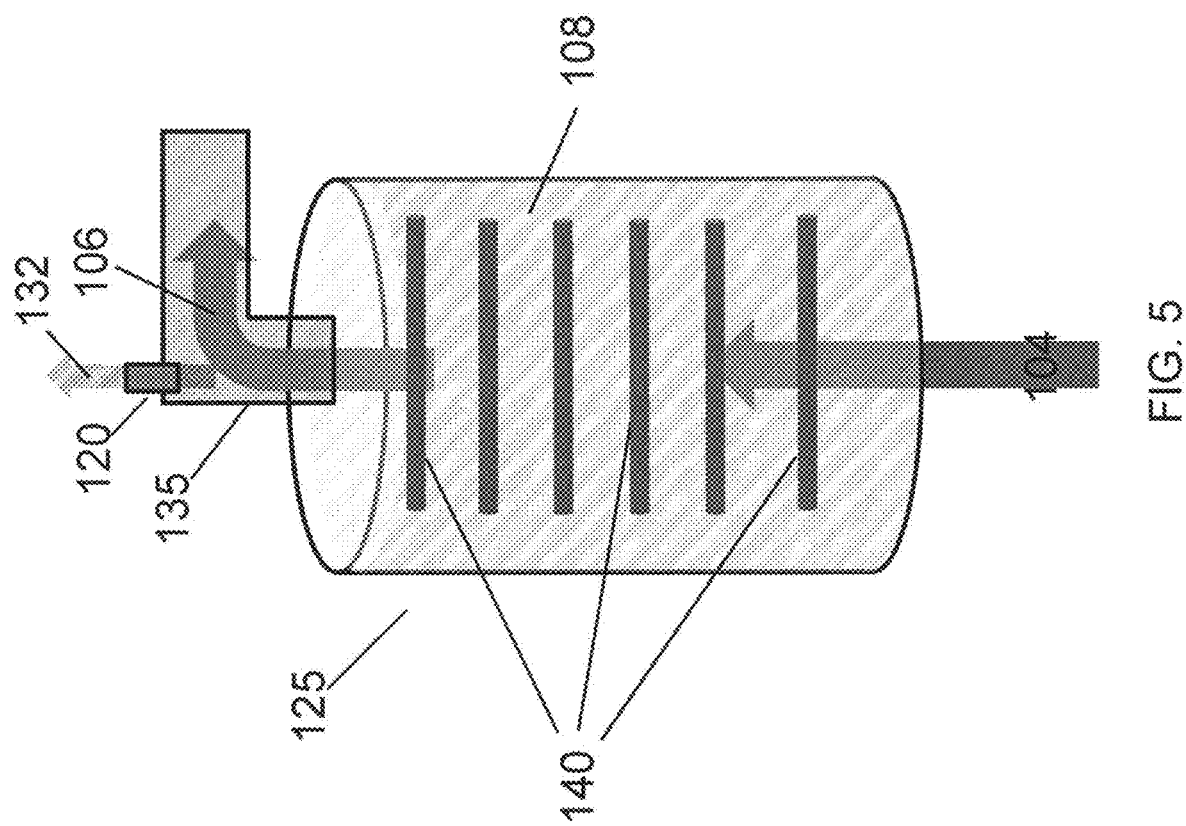
FIG. 5 is a schematic drawing illustrating another example of a reactor vessel in accordance with one or more aspects of the invention.

FIG. 5 is a schematic illustration of a degasifier 120 similar to the degasifier 120 illustrated in FIGS. 4A and 4B, but coupled to the upper portion of a UV reactor 125 that is oriented vertically, meaning that the longitudinal axis of the UV reactor 125 is substantially perpendicular to a horizontal line. According to this example, the UV lamps 140 are oriented horizontally, although other configurations are also possible. As fluid fills the reactor, gas generated from the reaction moves to the upper regions of the reactor and "pushes" the gas out of the top of the reactor into the conduit 135 that is in fluid communication with the outlet of the reactor and the second treated aqueous solution 106. Gas 132 then exits the degasifier 120 that is coupled to the exiting conduit 135. Although FIG. 5 illustrates a UV reactor 125 according to system 100 of FIG. 1A, a similar arrangement may also be used for reactor 145 in system 200 of FIG. 2A.

Figure 6A:
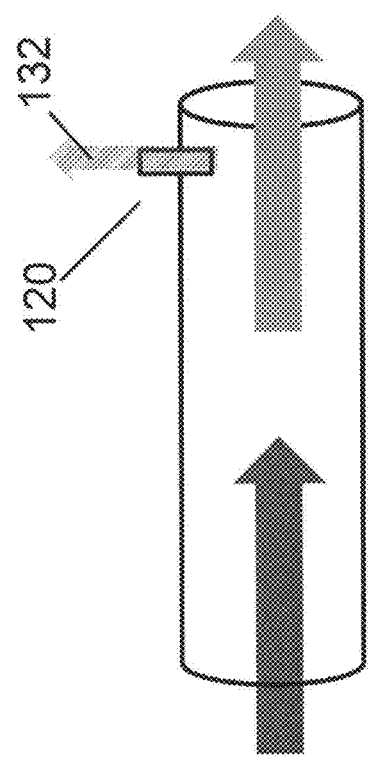

FIG. 6A illustrates one example of a position for a degasifier 120 coupled to a horizontally-oriented reactor vessel such as the UV reactor 125 shown in FIG. 3, and as will be appreciated, a similar arrangement may also be used for reactor 145 of system 200. FIG. 6A shows a degasifier 120 coupled to a top horizontal portion of the reactor near the downstream side of the vessel, in a similar manner as discussed above in reference to FIG. 3. For instance, as fluid flows through the vessel, it will "drag" the any formed gas bubble(s) along to the downstream side of the vessel and accumulate.

Figure 6C:
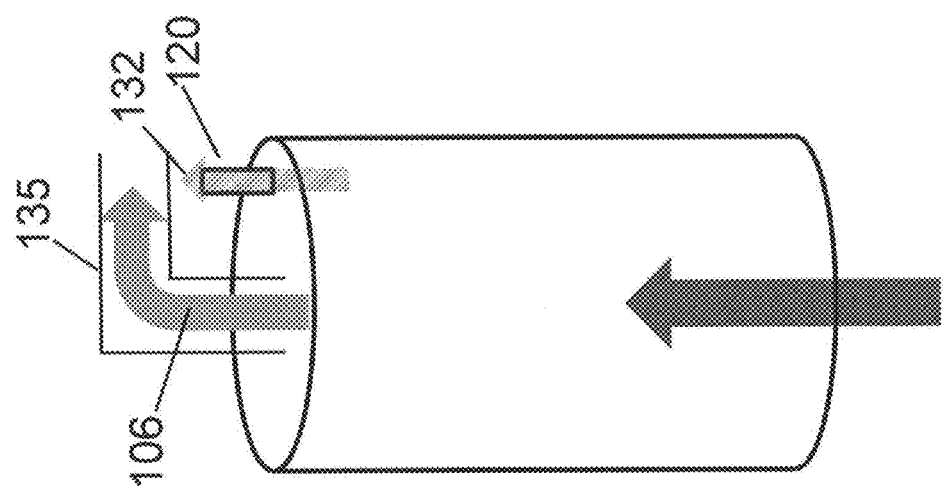
Figure 6B:
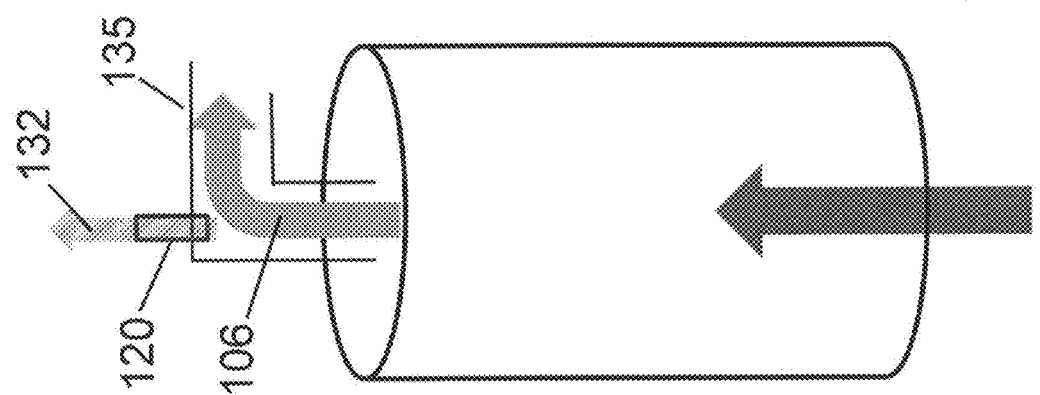

FIGS. 6B-6D are schematic illustrations of three different positions for a degasifier 120 coupled to a vertically-oriented reactor vessel such as UV reactor 125 discussed above in reference to FIG. 5. FIG. 6B shows a degasifier 120 coupled to a conduit 135 exiting the vessel, in a similar position as shown in FIG. 5. The conduit 135 exiting the vessel may transfer one or more reaction products, such as the second treated aqueous solution 106 discussed above. FIG. 6C shows an alternate position, where degasifier 120 coupled to a top horizontal portion of the reactor vessel. FIG. 6D illustrates an embodiment where the degasifier 120 is positioned in the exiting conduit where the conduit 135 makes a turn downward. This allows one or more gas bubbles pulled along by the exiting second treated aqueous solution 106 that collect in the "corner" region of the conduit (before it turns downward) to readily exit the system through the degasifier 120. As will be appreciated, the degasifier 120 may be positioned in alternate positions on the reactor so long as it doesn't interfere with or otherwise adversely affect the reaction processes that take place therein.

According to some embodiments, the level of pressure at which gas is released through the degasifier may be from near atmospheric pressure (14.7 psi) to 150 psi, although the pressure will vary depending on the type of valve and the position of the degasifier 120. For instance, pressures at which a float valve type of degasifier releases will depend on the configuration of the fluid and float within the degasifier device itself.

According to some embodiments, one or more gases may be dissolved in the treated fluid. In such instances, a degasifier comprising a membrane contactor may be positioned downstream from the reactor vessel, at a position where the membranes are not attached by any residual oxidant. This type of degasifier may also be connected to a vacuum source that facilitates the removal of the dissolved gases from the treated fluid. One example of this type of degasifier includes those commercially available under the tradename of LIQUI-CEL® membrane contactors available from Membrana, Charlotte, N.C.

Figure 7:
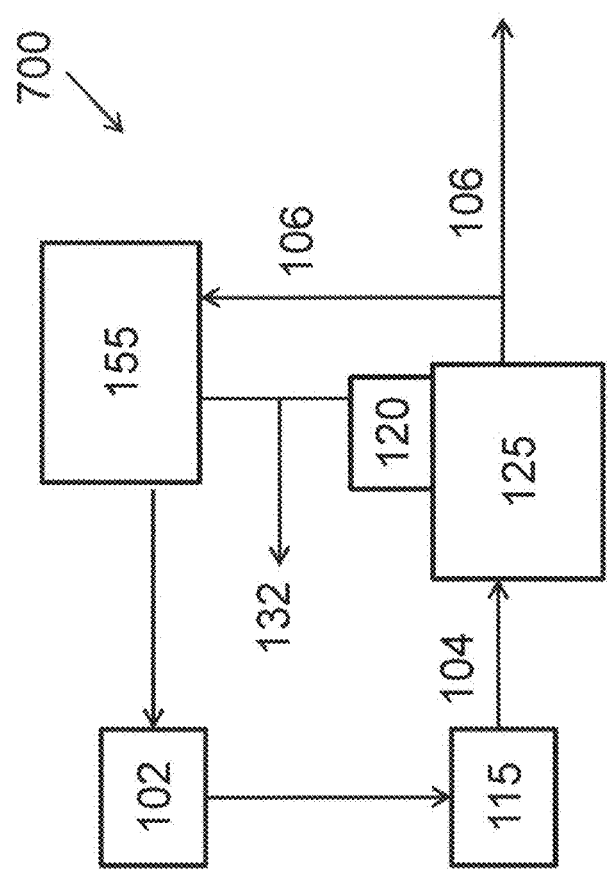
FIG. 7 is a schematic drawing illustrating a system in accordance with one or more aspects of the invention.

According to at least one embodiment at least a portion of the one or more gases 132 generated from the treatment of the contaminated groundwater with persulfate and UV may either exit the system and be released to the environments, and/or may be recycled and/or transferred or otherwise directed to another process or device either within the treatment system or external to the treatment system. According to some embodiments, at least a portion of the treated groundwater may be recycled or transferred to another unit operation or device either internal or external to the treatment system. FIG. 7 is a schematic illustration of one embodiment whereby system 700 is configured to transfer at least a portion of the second treated aqueous solution 106 to a unit operation 155. In addition, one or more gases 132 expelled through degasifier 120 may be allowed to escape and/or be recycled or transferred to another unit operation or device. System 700 is similar to system 100 of FIG. 1A in that a source of persulfate 115 is introduced to the contaminated groundwater 102 prior to being introduced to the UV reactor 125, although it will be appreciated that system 700 may be adapted to the system 200 shown in FIG. 2A. The unit operation 155 may be either internal or external to the treatment system and may function to recycle or reuse either or both the second treated aqueous solution 106 and gas 132. Recycling gas 132 may depend on the volume of gas and other considerations, such as the expense involved in capturing, collecting and reusing the gas 132.

Figure 8:
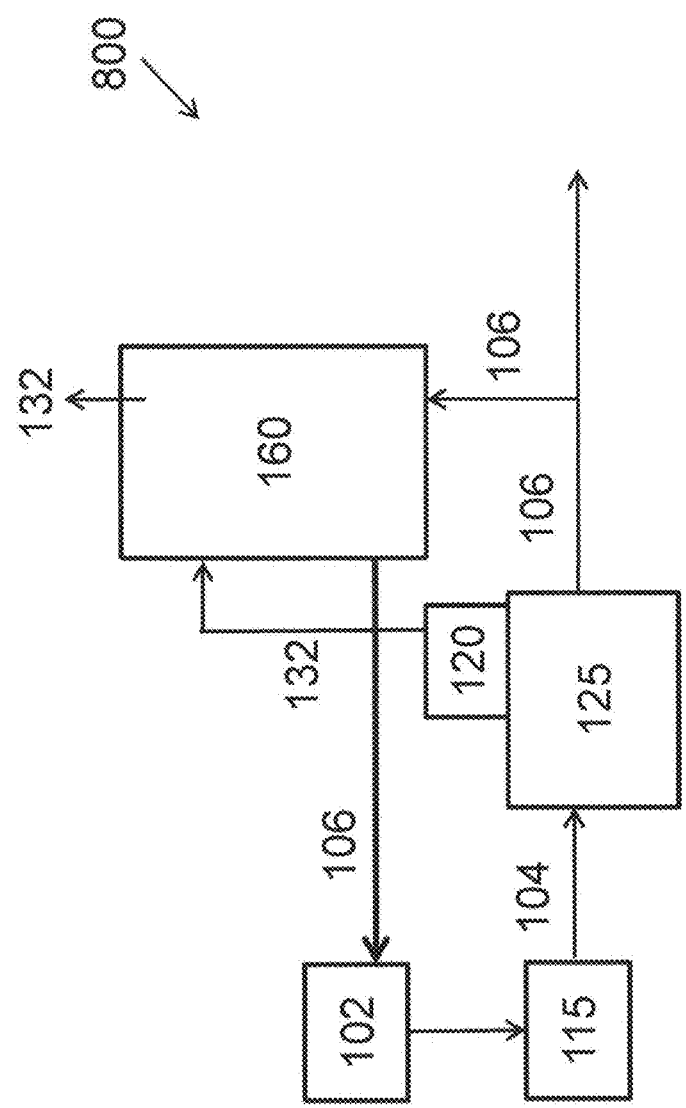
FIG. 8 is a schematic drawing illustrating a system in accordance with one or more aspects of the invention.

FIG. 8 is a schematic illustration of one embodiment of a system 800 where at least a portion of the second treated aqueous solution 106 and the gas 132 are transferred to a storage device 160. According to this embodiment, the gas 132 exits the UV reactor 125 and is directed to a top portion of the storage device 160, where it then exits the storage device 160, as shown in FIG. 8. At least a portion of the second aqueous solution 106 is introduced to the bottom portion of the storage device 160, where it is then recirculated to a point upstream from the introduction of persulfate 115. System 800 takes advantage of the fact that the one or more gases generated from the reaction are less dense than the treated groundwater and thereby allows for ease in separation.

According to some embodiments, a separate degasifier 120 may be omitted from system 800. For instance, in one embodiment, the gas 132 may exit the reactor with the second treated aqueous solution 106 and be introduced to the storage device 160. In another embodiment, the UV reactor 125 may be coupled to the storage device 160 by a conduit that has one end connecting to the top portion of the UV reactor 125, and another end connecting to the top portion of the storage device 160.

The storage device 160 may be a tank or vessel, and in some instances may be open to the atmosphere. According to other embodiments, the storage device 160 may include a degasifier 120, such as float valve as discussed above. Although system 800 is depicted in FIG. 8 to be similar to the treatment system 100 shown in FIG. 1A, it will be appreciated that system 800 may be adapted to system 200 as exemplified in FIG. 2B to include a single reactor 145 where both persulfate and UV are introduced to the contaminated groundwater 102.

According to a further embodiment, the treatment systems disclosed herein may include a sensor that is configured to measure the concentration of persulfate. According to yet a further embodiment, the system may include a sensor that is configured to measure the concentration of a specific organic contaminant. For example, if the groundwater contains a halogenated contaminant, the sensor may be configured to detect the presence of the halogen. Other types of sensors are also within the scope of this disclosure, including sensors that detect alkalinity, and sensors that detect temperature.

Although not explicitly shown, systems 100 and 200 may further include one or more flow control devices, such as valves, regulators, pipes or other conduits, connectors, and weirs.

According to at least one embodiment, the systems disclosed herein, including systems 100 and 200, may be a mobile-based platform. The mobile-based system may be scalable, modular, and portable, which allows the system to be customized according to the site-specific remediation requirements. The mobile-based platform may be designed to be both transported and operated from mobile platforms that may be moved between sites and on-site. Multiple systems may also be used, in series or in parallel, depending on the remediation needs at the site. In certain instances the mobile-based platform may be designed and sized to fit standard sized shipping containers, or may be designed and sized to a custom enclosure or platform such as a skid or trailer that is able to be driven from location to location.

The ultraviolet lamps can be advantageously positioned or distributed within the one or more reactors of the systems disclosed herein to irradiate or otherwise provide actinic radiation to the water as desired. In certain embodiments, it is desired to distribute the lamps within the one or more reactors to evenly distribute actinic radiation throughout the reactor. In any of the systems described herein, including systems 100 and 200, the ultraviolet lamps can be adjusted to provide illumination at various intensities or various power levels. For example, the ultraviolet lamps may be adjusted to operate at a plurality of illumination modes, such as dim, rated, and boost mode, for example, a low, medium, or high mode.

The one or more lamps can be positioned within the one or more actinic radiation reactors by being placed within one or more sleeves or tubes within the reactor. The tubes can hold the lamps in place and protect the lamps from the water within the reactor. The tubes can be made of any material that is not substantially degraded by the actinic radiation and the water or components of the water within the reactor, while allowing the radiation to pass through the material. The tubes can have a cross-sectional area that is circular. In certain embodiments, the tubes can be cylindrical, and constructed from quartz material. Each of the tubes can be the same or different shape or size as one or more other tubes. The tubes can be arranged within the reactor in various configurations, for example, the sleeves may extend across a portion of or the entire length or width of the reactor. The tubes can also extend across an inner volume of the reactor.

Commercially available ultraviolet lamps and/or quartz sleeves that are suitable for the processes disclosed herein may be obtained from Hanovia Specialty Lighting, Fairfield, N.J., Engineered Treatment Systems, LLC (ETS), Beaver Dam, Wis., and Heraeus Noblelight GmbH of Hanau, Germany. The quartz material selected can be based at least in part on the particular wavelength or wavelengths that will be used in the process. The quartz material may be selected to minimize the energy requirements of the ultraviolet lamps at one or more wavelengths. The composition of the quartz can be selected to provide a desired or suitable transmittance of ultraviolet light to the water and/or to maintain a desired or adequate level of transmissivity of ultraviolet light to the water. In certain embodiments, the transmissivity can be at least about 50% for a predetermined period of time. For example, the transmissivity can be about 80% or greater for a predetermined period of time. In certain embodiments, the transmissivity can be in a range of about 80% to 90% for about 6 months to about one year. In certain embodiments, the transmissivity can be in a range of about 80% to 90% for up to about two years.

The tubes can be sealed at each end so as to not allow the contents of the reactor from entering the sleeves or tubes. The tubes can be secured within the reactor so that they remain in place throughout the use of the reactor. In certain embodiments, the tubes are secured to the wall of the reactor. The tubes can be secured to the wall through use of a suitable mechanical technique, or other conventional techniques for securing objects to one another. The materials used in the securing of the tubes is preferably inert and will not interfere with the operation of the reactor or negatively impact the purity of the water, or release contaminants to the water.

The lamps can be arranged within the reactor such that they are parallel to each other. The lamps can also be arranged within the reactor at various angles to one another. For example, in certain embodiments, the lamps can be arranged to illuminate paths or coverage regions that form an angle of approximately 90 degrees such that they are approximately orthogonal or perpendicular to one another. The lamps can be arranged in this fashion, such that they form an approximately 90 degree angle on a vertical axis or a horizontal axis, or any axis therebetween.

In certain embodiments, the reactor can comprise an array of tubes in the reactor or vessel comprising a first set of parallel tubes and a second set of parallel tubes. Each tube may comprise at least one ultraviolet lamp and each of the parallel tubes of the first set can be arranged to be at a desired angle relative to the second set of parallel tubes. The angle may be approximately 90 degrees in certain embodiments. The tubes of any one or both of the first array and the second array may extend across an inner volume of the reactor. The tubes of the first set and the second set can be arranged at approximately the same elevation within the reactor.

Further configurations can involve tubes and/or lamps that are disposed to provide a uniform level of intensity at respective occupied or coverage regions in the reactor. Further configurations can involve equispacially arranged tubes with one or more lamps therein. The reactor may contain one or more arrays of tubes arranged within the reactor or vessel. A second array of tubes can comprise a third set of parallel tubes, and a fourth set of parallel tubes orthogonal to the third set of parallel tubes, each tube comprising at least one ultraviolet lamp. The fourth set of parallel tubes can also be orthogonal to at least one of the second set of parallel tubes and the first set of parallel tubes.

In certain embodiments, each array within the reactor or vessel can be positioned a predetermined distance or elevation from another array within the reactor. The predetermined distance between a set of two arrays can be the same or different.

Figure 10:
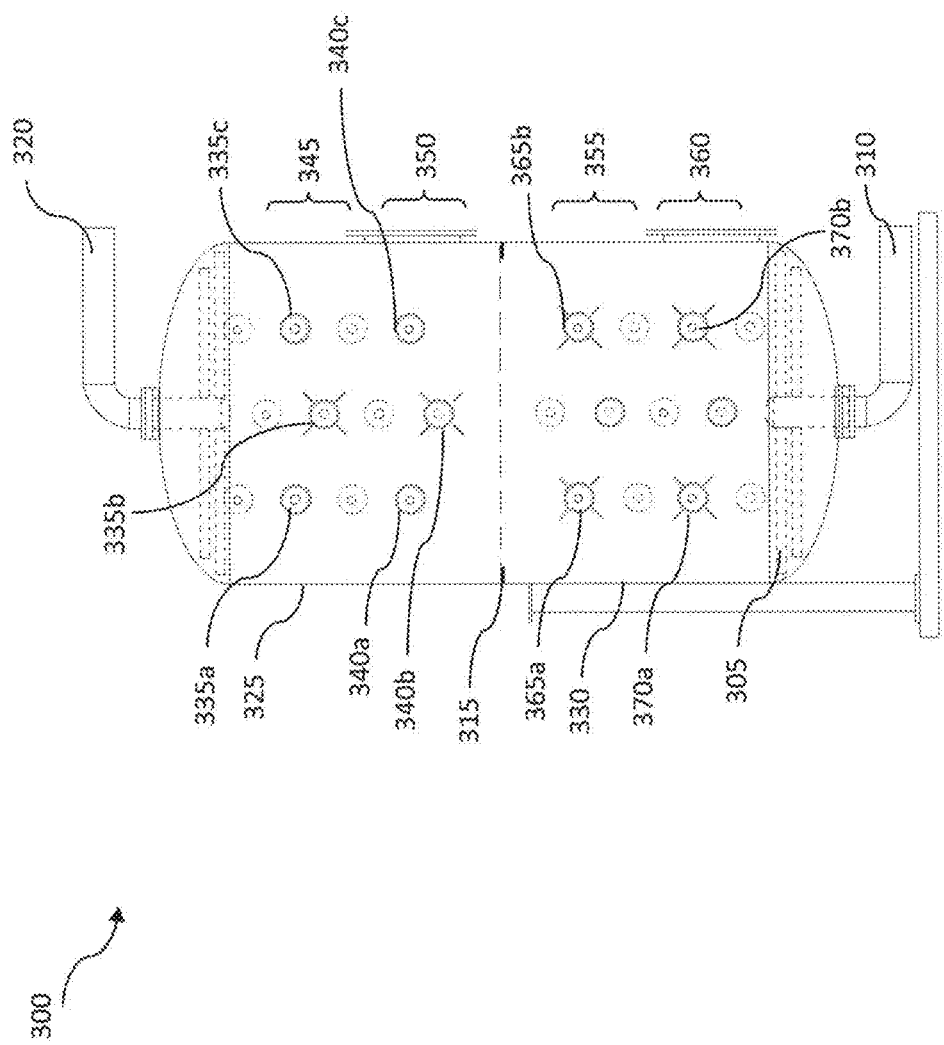
FIG. 10 is a schematic drawing illustrating a reactor in accordance with one or more aspects of the invention.

FIG. 10 exemplarily shows a cross-sectional view of a reactor vessel 300 that can be used in one or more of the systems disclosed herein. Reactor vessel 300 typically comprises inlet 310, outlet 320, and baffle 315 which divides reactor vessel 300 into upper chamber 325 and lower chamber 330. Reactor vessel 300 can also comprise manifold 305 which can be configured to distribute water introduced through inlet 310 throughout the vessel. In certain embodiments, manifold 305 can be configured to evenly distribute water throughout the vessel. For example, manifold 305 can be configured to evenly distribute water throughout the vessel such that the reactor operates as a plug flow reactor.

In some embodiments, the reactor vessel may comprise more than one baffle 315 to divide the reactor vessel into more than two chambers. Baffle 315 can be used to provide mixing or turbulence to the reactor. In certain embodiments, as shown in FIG. 10, reactor inlet 310 is in fluid communication with lower chamber 330 and reactor outlet 320 is in fluid communication with upper chamber 325.

In some embodiments, at least three reactor chambers, each having at least one ultraviolet (UV) lamp disposed to irradiate the water in the respective chambers with light of about or ranging from about 185 nm to about 254 nm, 220 nm, and/or 254 nm at a desired or at various power levels, are serially arranged in reactor 120.

The reactor vessel can also comprise a plurality of ultraviolet lamps positioned within tubes, for example tubes 335a-c and 340a-c. In one embodiment of the invention, as shown in FIG. 10, reactor vessel 300 comprises a first set of parallel tubes, tubes 335a-c and a second set of parallel tubes (not shown). Each set of parallel tubes of the first set is approximately orthogonal to the second set to form first array 345. Tubes 335a-c and the second set of parallel tubes are at approximately the same elevation in reactor vessel 300, relative to one another.

Further, the reactor vessel can comprise a third set of parallel tubes and a fourth set of parallel tubes. Each set of parallel tubes of the first set is approximately orthogonal to the second set to form, for example, second array 350. As exemplarily illustrated, tubes 340a-c and the second set of parallel tubes are at approximately the same elevation in reactor vessel 300, relative to one another. As shown in FIG. 10, first array 345 can be positioned at a predetermined distance from second array 350. Vessel 300 can additionally comprise third array 355 and fourth array 360, each optionally having similar configurations as first array 340 and second array 345.

In another embodiment, a first tube 335b can be arranged orthogonal to a second tube 340b to form a first array. Additionally, a set of tubes, tube 365a and tube 365b can be arranged orthogonal to another set of tubes, tube 370a and tube 370b to form a second array. The position of the lamps of the second array are shown in FIG. 11A, including lamps 414, 420, 422, and 424. The positions of the lamps in the first array and the second array are shown in FIG. 11B, including lamps 426 and 428 of the first array and lamps 414, 420, 422, and 424 of the second array.

The lamps can generate a pattern, depending on various properties of the lamp, including the dimensions, intensity, and power delivered to the lamp. The light pattern generated by the lamp is the general volume of space to which that the lamp emits light. In certain embodiments the light pattern or illumination volume is defined as the area or volume of space that the lamp can irradiate or otherwise provide actinic radiation to and allow for oxidation of the organic contaminant.

As shown in FIGS. 11A and 11B, which shows exemplarily cross-sectional views of reactor 400 in which a first set of tubes 410a-c are arranged parallel to one another, and a second set of tubes 412a-c are arranged parallel to one another. As shown, first set of tubes 410a-c is arranged orthogonal relative to second set of tubes 412a-c. Lamps, such as lamps 414, are dispersed within tubes 410a-c and 412a-c, and when illuminated, can generate light pattern 416.

One or more ultraviolet lamps, or a set of lamps, can be characterized as projecting actinic radiation parallel an illumination vector. The illumination vector can be defined as a direction in which one or more lamps emit actinic radiation. In an exemplarily embodiment, as shown in FIG. 11A, a first set of lamps, including lamp 420 and 422, are disposed to project actinic radiation parallel to illumination vector 418.

According to some embodiments, a first set of ultraviolet lamps each of which is disposed to project actinic radiation parallel a first illumination vector can be energized. In a further embodiment, a second set of ultraviolet lamps each of which is disposed to project actinic radiation parallel a second illumination vector can also be energized. At least one of the direction of the illumination and the intensity of at least one of the first set of ultraviolet lamps and the second set of ultraviolet lamps can be adjusted. Each set of ultraviolet lamps can comprise one or more ultraviolet lamps.

The number of lamps utilized or energized and the configuration of the lamps in use can be selected based on the particular operating conditions or requirements of the system. For example, the number of lamps utilized for a particular process can be selected and controlled based on characteristics or measured or calculated parameters of the system. Measured parameters of the inlet water or treated water can include any one or more of a number of different system parameters, including TOC concentration, alkalinity, temperature, and flow rate. The number of energized lamps can also be selected and controlled based on the concentration or amount of persulfate added to the system. For example, 121 lamps in a particular configuration can be used if the flow rate of the water to be treated is at or below a certain threshold value, for example a nominal or design flow rate, while more lamps can be used if the flow rate of the water to be treated rises above the threshold value. Thus, the flow rate of the water can be partially determinative of which lamps and/or the number of energized lamps in each reactor.

According to one or more embodiments, a total organic carbon (TOC) value of the contaminated groundwater that is being treated may be measured and a rate at which persulfate is introduced to the contaminated groundwater and/or a dose of the UV light may be adjusted based on the measured TOC value. In some embodiments, adjusting the rate at which the persulfate is introduced to the contaminated groundwater may include adjusting a flow rate of persulfate. According to other embodiments, adjusting the rate at which the persulfate is introduced may include adjusting the concentration of the persulfate. For instance, the concentration of persulfate may be increased or decreased, depending on one or more measured TOC readings. According to at least one embodiment, a TOC value of the second treated aqueous solution may be measured. A portion of the second treated aqueous solution may be recirculated to a point upstream from the introduction of persulfate based on the measured TOC value of the second treated aqueous solution, such as shown in FIGS. 7 and 8. In some instances, a portion of the second treated aqueous solution 106 may be recirculated based on the measurement of one or both the TOC value of the contaminated groundwater 102 and the TOC value of the second treated aqueous solution 106. For instance, in some embodiments, the treatment by the persulfate and the UV may reduce the concentration of the organic contaminant to a desired or otherwise predetermined level in a single pass. According to at least one aspect, the second treated aqueous solution 106 is potable water. According to other embodiments, at least a portion of the contaminated groundwater 102 may be exposed to the persulfate and the UV in multiple passes for purposes of reducing the concentration of the organic contaminant to an acceptable level. The second treated aqueous solution 106 may be recirculated for other reasons as well, such as to dilute the concentration of contaminants in the groundwater in instances where the groundwater is stored or otherwise held in a container or vessel prior to treatment.

According to some embodiments, adjusting a dose of the ultraviolet light may comprise at least one of adjusting an intensity of the UV light and adjusting an exposure time of the UV light to the first treated aqueous solution 104. For instance, the first treated aqueous solution 104 may be held or otherwise contained within a reactor or vessel and be exposed to UV light for a predetermined exposure time while the solution is housed within the reactor or vessel. According to some embodiments, baffles or other flow control devices positioned within the reactor or vessel may also contribute to containing the first treated aqueous solution for a predetermined exposure time. According to other embodiments, adjusting a dose of the ultraviolet light may comprise adjusting a flow rate of the first treated aqueous solution 104. For instance, the first treated aqueous solution 104 may pass through a conduit that is configured to allow UV light to pass through to the conduit to irradiate the first treated aqueous solution. According to other embodiments, the dose of the UV light may be adjusted by adjusting a power setting of the UV light, or by adjusting the wavelength of the UV lamp.

According to some embodiments, at least one of the intensity of the UV light and the dose of UV light may be adjusted based on one or more operating parameters, such as a TOC value. UV dose, when applied to a persulfate, is a measure of the total lamp electrical energy applied to a fixed volume of water. The units are usually measured in kWh/1000 gallons. This parameter combines flow rate, residence time, and light intensity into a single term. The dose may vary from one type of contaminated water to the other. However, the dosage may be set to destroy virtually all types of contaminants to any level required. The calculation for either batch or flowthrough treatment is shown below by Equations 7 and 8, respectively:

Batch:

$$\text{UV Dose} = (\text{lamp power (kW)}) \times \text{time (hrs)} \times 1000 / (\text{batch volume (gal.)}) \quad \text{Equation 7:}$$

Flowthrough:

$$\text{UV Dose} = (\text{lamp power (kW)}) \times 1000 / (\text{flow (gpm)} \times 60) \quad \text{Equation 8:}$$

According to at least one embodiment, a controller, as discussed further below, may be used to control the UV dose for batch and flowthrough processes, including the lamp power, the exposure time, the and the flow rate. In accordance with some embodiments, the UV dose is at least 10 kWh/1000 gallons.

The controller 150 of FIGS. 1A and 2A may be in communication with one or more sensors or input devices that are configured to provide an indication or representation of at least one property, characteristic, state or condition of at least one of a process stream, a component, or a subsystem of treatment systems 100 and 200. For example, controller 150 may be operatively coupled or otherwise configured to receive input signals from any one or more sensors 130a and 130b. The controller 150 may also be operatively coupled to receive input signals from the contaminated groundwater 102 or any other water stream in the system. The input signals can also be representative of any property of the water, and may provide an indication of the resistivity or conductivity, the flow rate, the TOC value, alkalinity, the temperature, the pressure, concentration values of a particular compound or species, the amount of bacteria, the dissolved oxygen content, and/or the dissolved nitrogen content. Although only sensors 130a and 130b are particularly depicted, additional sensors may be utilized, for example, one or more temperature, conductivity, alkalinity, flow rate, or resistivity sensors in systems 100 and 200. For instance, an additional sensor may be positioned to measure one or more properties of the first treated aqueous stream 104, such as the persulfate concentration, in system 100 of FIG. 1A.

Controller 150 can be configured to receive any one or more input signals and generate one or more drive, output, and control signals to any one or more components of systems 100 and 200. As illustrated, the controller 150 may, for example, receive an indication of a flow rate, a TOC level, or both, of the contaminated groundwater 102, the second treated aqueous solution 106, or from another position within the system. The controller 150 may generate and transmit a drive signal or otherwise control any of the media filter 110, source of persulfate 115, UV reactor 125 or reactor 145, and the second treated aqueous stream 106, in response to the input signals. For instance, the controller 150 may generate and transmit a drive signal to the source of persulfate 115 to, if necessary, adjust the rate of addition of persulfate introduced into the contaminated groundwater 102. The drive signal may be based on one or more input signals and a target or predetermined value or set-point. For instance, if the input signal that provides a representation of the TOC value of the contaminated groundwater 102 or second treated aqueous stream 106 is above a target TOC value or a range of acceptable TOC values, i.e., a tolerance range, then the drive signal can be generated to increase an amount or a rate of addition of the persulfate 115 and/or a dose of UV light. The target value may be application specific and may vary from installation to installation and be dependent on standards established by local or federal governments or downstream processing or use requirements.

In some embodiments, the controller 150 may, for example, receive an indication of a flow rate and/or a TOC concentration or level and generate and transmit a drive signal to the source of persulfate 115 and/or the source of UV, such as the lamps of UV reactor 125 or reactor 145 to adjust or modify at least one of the one or more lamps in operation and the intensity of the lamps. The drive signal can be based on the one or more input signals and a target or predetermined value or set-point, or threshold value. For example, if the input signal that provides a representation of the TOC value of the contaminated groundwater 102 or second treated aqueous stream 106 is above the target TOC value or threshold value, or a range of acceptable TOC values, i.e., a tolerance range, then the drive signal can be generated to adjust the rate of persulfate 115 introduced to the contaminated groundwater 102 and/or dose administered by the UV source, such as by adjusting at least one of the lamp configuration and the lamp intensity. In some embodiments, the controller 150 may also receive an indication of a persulfate amount or rate of addition, and generate and transmit a drive signal to the source of persulfate 115 and/or the UV source in response to the input signal associated with the persulfate amount, such as the persulfate concentration in one or more of the water streams of the system. According to some embodiments, the controller 150 may generate and transmit control signals to, for example, energize or adjust an intensity or power of output radiation emitted by UV source. Thus, depending on the amount or rate of addition of persulfate 115 and/or the level of TOC in the contaminated groundwater 102, the control signal may be increased or decreased appropriately, incrementally, or proportionally.

The controller 150 may be configured in a feedback arrangement and generate and transmit one or more control signals to any one of the source of persulfate 115 and the UV source in UV reactor 125 and reactor 145. For instance, the TOC value or the resistivity, or both, of the second treated aqueous solution 106 may be utilized to generate control signals to any of contaminated groundwater 102, the source of persulfate 115, and the UV source in UV reactor 125 and reactor 145.

During periods of high initial TOC fluctuations, a feedforward control may be utilized to compensate for instrument delay. This technique may allow the addition of persulfate 115 at a surplus value relative to the amount of contaminants. During periods of stable TOC levels, the feedback approach may be utilized with or without the feedforward control.

Figure 9:
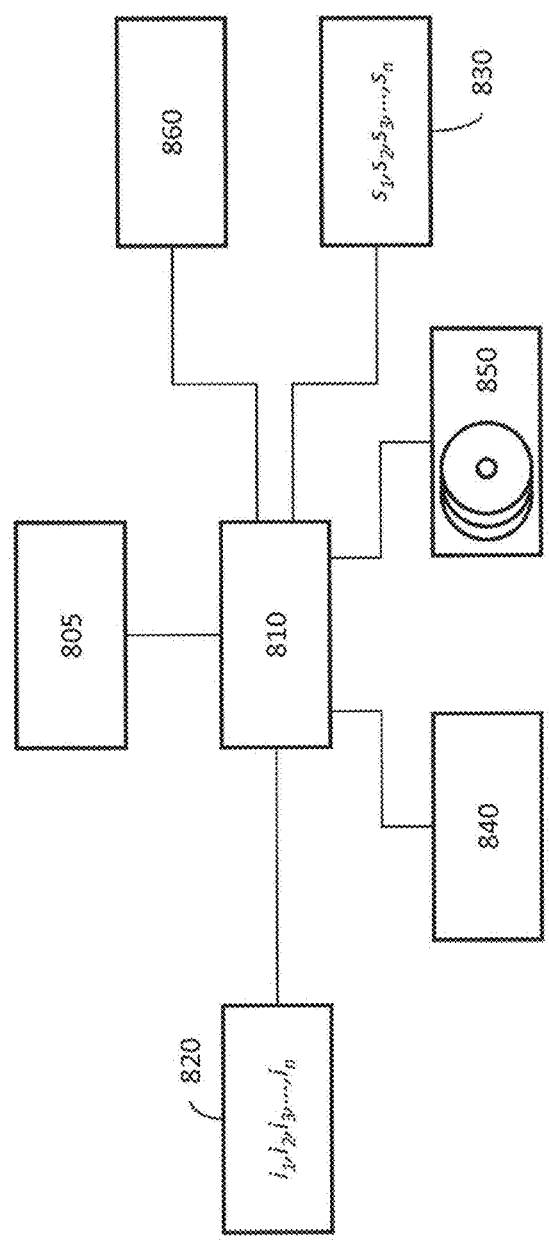
FIG. 9 is a schematic drawing illustrating a processor or controller upon which one or more aspects of the invention may be practiced.

According to some embodiments, controller 150 may be implemented using one or more processors as schematically represented in FIG. 9. Controller 150 may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the control system may include specially-programmed, special-purpose hardware, for example, an application-specific integrated circuit (ASIC) or controllers intended for analytical systems.

Controller 150 may include one or more processors 805 typically connected to one or more memory devices 850, which can comprise, for example, any one or more of a disk drive memory, a flash memory device, a RAM memory device, or other device for storing data. Memory device 850 is typically used for storing programs and data during operation of the systems 100 and 200 and/or controller 150. For example, memory device 850 may be used for storing historical data relating to the parameters over a period of time, as well as operating data. Software, including programming code that implements embodiments of the invention, can be stored on a computer readable and/or writeable nonvolatile recording medium, and then typically copied into memory device 850 wherein it can then be executed by processor 805. Such programming code may be written in any of a plurality of programming languages, for example, Java, Visual Basic, C, C#, or C++, Fortran, Pascal, Eiffel, Basic, COBAL, or any of a variety of combinations thereof.

Components of controller 150 may be coupled by an interconnection mechanism 810, which may include one or more busses, e.g., between components that are integrated within a same device, and/or a network, e.g., between components that reside on separate discrete devices. The interconnection mechanism typically enables communications, e.g., data, instructions, to be exchanged between components of the system.

Controller 150 may also include one or more input devices 820 receiving one or more input signals $i_1$, $i_2$, $i_3$, . . . , $i_n$, from, for example, a keyboard, mouse, trackball, microphone, touch screen, and one or more output devices 830, generating and transmitting, one or more output, drive or control signals, $s_1$, $s_2$, $s_3$, . . . , $s_n$, to for example, a printing device, display screen, or speaker. In addition, controller 150 may contain one or more interfaces 860 that can connect controller 150 to a communication network (not shown) in addition or as an alternative to the network that may be formed by one or more of the components of the system.

According to one or more embodiments of the invention, the one or more input devices 820 may include components, such as but not limited to, valves, pumps, and sensors 130*a* and 130*b* that typically provide a measure, indication, or representation of one or more conditions, parameters, or characteristics of one or more components or process streams of systems 100 and 200. Alternatively, the sensors, the metering valves and/or pumps, or all of these components may be connected to a communication network that is operatively coupled to the controller 150. For example, sensors 130*a* and 130*b* may be configured as input devices that are directly connected to the controller 150, metering valves and/or pumps of associated with the source of persulfate 115 or positioned anywhere else in the system may be configured as output devices that are connected to the controller 150, and any one or more of the above may be coupled to a computer system or an automated system, so as to communicate with the controller 150 over a communication network. Such a configuration permits one sensor to be located at a significant distance from another sensor or allow any sensor to be located at a significant distance from any subsystem and/or the controller, while still providing data therebetween.

The controller 150 may comprise one or more storage media such as a computer-readable and/or writeable non-volatile recording medium in which signals can be stored that define a program or portions thereof to be executed by, for example, one or more processors 805. The one or more storage media may, for example, be or comprise a disk drive or flash memory. In typical operation, processor 805 can cause data, such as code that implements one or more embodiments of the invention, to be read from the one or more storage media into, for example, memory device 840 that allows for faster access to the information by the one or more processors than does the one or more media. Memory device 840 is typically a volatile, random access memory such as a dynamic random access memory (DRAM) or static memory (SRAM) or other suitable devices that facilitates information transfer to and from processor 805.

Although the controller 150 is shown by way of example as one type of computer system upon which various aspects of the invention may be practiced, it should be appreciated that the invention is not limited to being implemented in software, or on the computer system as exemplarily shown. Indeed, rather than being implemented on, for example, a general purpose computer system, the control system, or components or subsystems thereof, may be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by processor 805 can be performed in separate computers, each of which can be in communication through one or more networks.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

The invention claimed is:

1. A method of removing 1,4-dioxane from a groundwater, comprising:
    providing a contaminated groundwater having an initial concentration of 1,4-dioxane of at least 25 ppb;
    introducing a persulfate to the contaminated groundwater to produce a first treated aqueous solution;
    exposing the first treated aqueous solution to ultraviolet light to produce a second treated aqueous solution and one or more gases from oxidation of the 1,4-dioxane, the second treated aqueous solution having a concentration of the 1,4-dioxane less than about 1 ppb; and
    removing the one or more gases generated from exposing the first treated aqueous solution to the ultraviolet light.

2. The method of claim 1, wherein exposing the first treated aqueous solution comprises introducing the first treated aqueous solution to a reactor vessel.

3. The method of claim 2, wherein removing the one or more gases comprises removing the one or more gases from the reactor vessel.

4. The method of claim 3, wherein the one or more gases are removed from the reactor vessel through a degasifier coupled to the reactor vessel.

5. The method of claim 2, wherein removing the one or more gases comprises removing the one or more gases from a conduit exiting the reactor vessel.

6. The method of claim 2, wherein the contaminated groundwater is introduced to the reactor vessel at a flow rate of at least 100 gallons per minute.

7. The method of claim 1, further comprising directing the one or more gases and at least a portion of the second treated aqueous solution to a storage device, the storage device configured to remove at least a portion of the one or more gases.

8. The method of claim 7, further comprising recirculating at least a portion of the second treated aqueous solution from the storage device to a point upstream from the introduction of the persulfate.

9. The method of claim 1, further comprising introducing the contaminated groundwater to a media filter prior to introducing the persulfate.

10. The method of claim 1, further comprising extracting the contaminated groundwater from a remediation site.

11. The method of claim 1, wherein the contaminated groundwater has an initial 1,4-dioxane concentration of up to about 800 ppb.

12. A system for removing 1,4-dioxane from a groundwater, comprising:
    a source of contaminated groundwater having an initial concentration of an 1,4-dioxane of at least 25 ppb;
    a source of persulfate fluidly connected to the source of contaminated groundwater and configured to introduce a persulfate to the contaminated groundwater;
    an actinic radiation source fluidly connected to the source of contaminated groundwater and configured to irradiate the contaminated groundwater and persulfate to oxidize the 1,4-dioxane in the contaminated groundwater to produce one or more gases;
    at least one degasifier configured to remove the one or more gases from the irradiated groundwater.

13. The system of claim 12, further comprising a reactor fluidly connected to the source of contaminated groundwater and the source of persulfate and configured to house the actinic radiation source.

14. The system of claim 13, wherein at least one degasifier is coupled to the reactor.

15. The system of claim 14, wherein the reactor is oriented horizontally.

16. The system of claim 13, wherein at least one degasifier is coupled to a conduit exiting the reactor.

17. The system of claim 16, wherein the reactor is oriented vertically.

18. The system of claim 13, further comprising a storage device positioned downstream from the reactor, wherein at least one degasifier is coupled to the storage device.

19. The system of claim 12, wherein at least one degasifier is coupled to a conduit in fluid communication with the source of persulfate.

20. The system of claim 12, further comprising a media filter positioned upstream from the source of persulfate.

21. The system of claim 12, wherein at least one degasifier is positioned upstream of the actinic radiation source.

* * * * *